US009504137B2

(12) United States Patent
Morrisroe

(10) Patent No.: US 9,504,137 B2
(45) Date of Patent: Nov. 22, 2016

(54) CAPACITIVELY COUPLED DEVICES AND OSCILLATORS

(71) Applicant: Peter J Morrisroe, New Milford, CT (US)

(72) Inventor: Peter J Morrisroe, New Milford, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 257 days.

(21) Appl. No.: 14/246,833

(22) Filed: Apr. 7, 2014

(65) Prior Publication Data

US 2014/0332506 A1 Nov. 13, 2014

Related U.S. Application Data

(60) Provisional application No. 61/809,654, filed on Apr. 8, 2013.

(51) Int. Cl.

| | |
|---|---|
| ***B23K 10/00*** | (2006.01) |
| ***H05H 1/46*** | (2006.01) |
| ***H05H 1/24*** | (2006.01) |
| ***H05H 1/30*** | (2006.01) |

(52) U.S. Cl.

CPC ............. *H05H 1/46* (2013.01); *H05H 1/2406* (2013.01); *H05H 1/30* (2013.01); *H05H 2001/469* (2013.01)

(58) Field of Classification Search

CPC ........ H05H 1/46; H05H 1/30; H05H 1/2406; H05B 2001/469

USPC ............ 219/121.48, 121.51, 121.52, 121.54, 219/75; 315/111.51

See application file for complete search history.

(56) References Cited

U.S. PATENT DOCUMENTS

| | | | | |
|---|---|---|---|---|
| 3,958,883 A | 5/1976 | Turner | | |
| 5,081,397 A | 1/1992 | Liang | | |
| 6,329,628 B1 | 12/2001 | Kuo | | |
| 7,091,441 B1 | 8/2006 | Kuo | | |
| 8,622,735 B2 * | 1/2014 | Morrisroe | F23C 99/001 | 219/121.36 |
| 9,259,798 B2 * | 2/2016 | Morrisroe | B23K 10/02 | |
| 2003/0070913 A1 * | 4/2003 | Miller | G01N 21/68 | 204/192.1 |
| 2007/0075051 A1 * | 4/2007 | Morrisroe | H05H 1/30 | 219/121.52 |
| 2011/0241547 A1 * | 10/2011 | Wei | H01J 37/32091 | 315/111.21 |
| 2011/0272386 A1 * | 11/2011 | Morrisroe | H05H 1/30 | 219/121.52 |
| 2012/0261390 A1 | 10/2012 | Boulos | | |
| 2015/0000842 A1 * | 1/2015 | Hirano | G05B 11/01 | 156/345.28 |

OTHER PUBLICATIONS

WO/ISR for PCT/US2014/033191 mailed on Nov. 7, 2014.

* cited by examiner

*Primary Examiner* — Mark Paschall

(74) *Attorney, Agent, or Firm* — Rhodes IP PLC; Christopher R Rhodes

(57) ABSTRACT

Certain embodiments described herein are directed to devices that can be used to sustain a capacitively coupled plasma. In some examples, a capacitive device can be used to sustain a capacitively coupled plasma in a torch in the absence of any substantial inductive coupling. In certain embodiments, a helium gas flow can be used with the capacitive device to sustain a capacitively coupled plasma.

20 Claims, 35 Drawing Sheets

| EP (eV) | State | Analyte | 40 MHz CCP with USN | 40 MHz with Meinhard | 27 MHz CCP with Meinhard | Normal ICP |
|---|---|---|---|---|---|---|
| 6.53 | I | As 188.979 | 4.4 | 16 | 5.1 | 1.8 |
| 12.57 | II | Tl 190.801 | 181 | ND | ND | 1.9 |
| 6.37 | I | As 193.696 | 5.0 | 24 | 4.8 | 3.1 |
| 6.3 | I | Se 196.026 | 1.0 | 4.1 | 3.9 | 1.6 |
| 15.33 | II | Zn 206.200 | 0.21 | 6.0 | 2.5 | 0.28 |
| 5.79 | I | Zn 213.857 | 0.0094 | 0.065 | 0.048 | 0.11 |
| 13.2 | II | Cd 214.440 | 0.28 | | 1.1 | 0.23 |
| 13.04 | II | Pb 220.353 | 2.6 | ND | 14 | 1.2 |
| 13.25 | II | Cu 224.700 | 0.71 | 8.3 | 5.4 | 1.1 |
| 14.46 | II | Cd 226.502 | 0.27 | 2.9 | 1.8 | 0.21 |
| 5.42 | I | Cd 228.802 | 0.020 | 0.047 | 0.090 | 0.50 |
| 12.2 | II | Mn 257.610 | 0.10 | 0.48 | 0.18 | 0.019 |
| 4.48 | I | Tl 276.787 | 0.42 | 2.7 | 1.5 | 2.0 |
| 12.07 | II | Mg 280.271 | 0.13 | 0.57 | 0.11 | 0.19 |
| 4.35 | I | Mg 285.213 | 0.075 | 0.20 | 0.04 | 2.0 |
| 3.82 | I | Cu 324.752 | 0.022 | 0.10 | 0.07 | 0.32 |
| 3.52 | I | Tl 351.924 | 2.1 | 58 | 2.6 | 3.5 |
| 3.07 | I | Mn 403.075 | 0.42 | | 0.28 | 0.22 |
| 3.05 | I | Pb 405.781 | 0.22 | 1.6 | 1.6 | 2.3 |

= New spectrometer
= old spectrometer

FIG. 13A

| | CCP | ICP |
|---|---|---|
| As | 5.1 | 1.8 |
| Tl | 1.5 | 1.9 |
| Se | 3.9 | 1.6 |
| Zn | 0.048 | 0.11 |
| Cd | 0.09 | 0.21 |
| Pb | 1.6 | 1.2 |
| Cu | 0.07 | 0.32 |
| Mn | 0.18 | 0.019 |
| Mg | 0.04 | 0.19 |

FIG. 13B

Mg Ion to Mg atom Ratios

| **Analyte** | 40 MHz CCP with USN | 40 MHz with Meinhard | 27 MHz CCP with Meinhard | Normal ICP |
|---|---|---|---|---|
| MgII/MgI | **0.5** | **0.2** | **0.2** | **8** |

= New spectrometer

= old spectrometer

FIG. 15

| DLs (ppb) | | |
|---|---|---|
| | **CCP** | **ICP** |
| Cl 771.758 | **433** | — |
| Br 827.244 | **360** | — |

FIG. 18

CAPACITIVELY COUPLED DEVICES AND OSCILLATORS

PRIORITY APPLICATION

This application is related to, and claims the benefit of, U.S. Application No. 61/809,654 filed on Apr. 8, 2013, the entire disclosure of which is hereby incorporated herein by reference for all purposes.

TECHNOLOGICAL FIELD

This application is directed to plasma devices and methods using them. In particular, certain embodiments described herein are directed to devices effective to generate and/or sustain a capacitively coupled plasma without substantial inductive coupling.

BACKGROUND

Plasma devices typically include an inductively coupled plasma (ICP) that is sustained using an inductive coil that provides electromagnetic induction. The typical temperature of an ICP is around 6000 to 10,000 Kelvin. A capacitively coupled plasma (CCP) can be generated using two electrodes separated by a small distance. The electrodes of a CCP device are typically placed inside a reactor, which can result in contamination of the CCP.

SUMMARY

In a first aspect, a device comprising a torch, and a capacitive device configured to provide radio frequency energy to the torch to sustain a capacitively coupled plasma in the torch is provided. In certain examples, the capacitive device can be external to and around at least a portion of the torch, e.g., the capacitive device may contact an outer surface of the torch. In some embodiments, only a single capacitive device may be present with only one end of the capacitive device electrically coupled to a radio frequency energy source. In other instances, one end of the capacitive device can be electrically coupled to a capacitor and the other end can be electrically coupled to a transistor through an inductor.

In certain examples, the capacitive device can be configured to sustain the capacitively coupled plasma in the absence of any substantial inductive coupling. In other examples, the capacitive device can include a wire coil. In additional examples, the torch can include a substantially cylindrical hollow alumina body. In further examples, the capacitive device can be electrically coupled to an oscillator. In other examples, the capacitive device can be a substantially cylindrical device that surrounds at least a portion of the torch. In some examples, the capacitive device can be electrically coupled to an oscillator. In certain examples, the capacitive device can include a plate electrode comprising an aperture for receiving at least a portion of the torch. In some embodiments, the device can include an additional capacitive device configured to provide radio frequency energy to the torch, e.g., an additional capacitive device external to and surrounding at least a portion of the torch can be present. In some examples, the capacitive device and the additional capacitive device can each be electrically coupled to the same oscillator. In certain embodiments, the capacitive device and the additional capacitive device can each be electrically coupled to a different oscillator. In other examples, at least one of the capacitive device and the additional capacitive device comprises a plate electrode. In some examples, the capacitive device can be constructed and arranged to operate using 110-120 Volts alternating current or a portable power source.

In another aspect, a non-inductively coupled plasma device comprising a torch, and a capacitive device configured to provide radio frequency energy to the torch to sustain a capacitively coupled plasma in the torch without the use of inductive coupling. In certain embodiments, the capacitive device can be external to and around at least a portion of the torch, e.g., the capacitive device may, if desired, contact the outer surface of the torch. In some embodiments, only a single capacitive device may be present with only one end of the capacitive device electrically coupled to a radio frequency energy source. In other instances, one end of the capacitive device can be electrically coupled to a capacitor and the other end can be electrically coupled to a transistor through an inductor.

In certain embodiments, the capacitive device can include a wire coil electrically coupled at one end to an oscillator. In some embodiments, the device can include a torch comprising alumina. In other embodiments, the capacitive device comprises a plate electrode. In further embodiments, the capacitive device is a substantially cylindrical device that surrounds at least a portion of the torch. In additional embodiments, the capacitive device can be electrically coupled to an oscillator, which, for example, can be air cooled using a fan or other suitable device. In some examples, the device can include an additional capacitive device configured to provide radio frequency energy to the torch. In further examples, the capacitive device and the additional capacitive device can each be electrically coupled to the same oscillator or to a different oscillator. In some embodiments, at least one of the capacitive device and the additional capacitive device comprises a plate electrode. In other embodiments, each of the capacitive device and the additional capacitive device comprises a plate electrode. In certain examples, the capacitive device can be constructed and arranged to operate using 110-120 Volts alternating current or using a portable power source.

In an additional aspect, a device comprising a torch comprising an inlet, an outlet and a torch body, e.g., a metal oxide torch body, between the inlet and the outlet, an oscillator, and a capacitive device electrically coupled to the oscillator at one end and configured to provide radio frequency energy to the torch to sustain a capacitively coupled plasma in the torch is described. In certain examples, the capacitive device can be external to and around at least a portion of the torch, e.g., may contact some portion of the external surface of the torch. In some embodiments, only a single capacitive device may be present. In other instances, one end of the capacitive device can be electrically coupled to a capacitor of the oscillator and the other end can be electrically coupled to a transistor of the oscillator through an inductor.

In certain embodiments, the torch body can include alumina. In other examples, the inlet and the outlet of the torch each comprises alumina. In further examples, the torch body may include a metal oxide which, for example, can be a dielectric metal oxide. In other examples, the capacitive device comprises a wire electrically coupled to the oscillator at only one end of the wire, the wire further comprising a coil comprising an aperture to receive at least a portion of the torch body. In some examples, the coil can be in contact with at least a portion of the torch body. In additional examples, the device can include an additional capacitive device configured to provide radio frequency energy to the torch. In some embodiments, the capacitive device and the additional capacitive device can each be electrically coupled to the same oscillator or to a different oscillator. In other embodiments, at least one of the capacitive device and the additional capacitive device comprises a plate electrode. In some examples, the capacitive device is constructed and arranged to operate using 110-120 Volts alternating current or a portable power source.

In another aspect, a device comprising a torch comprising an inlet, an outlet and a torch body between the inlet and the outlet, an oscillator, and a capacitive device comprising a first electrode electrically coupled to the oscillator at one end and coupled to the torch body at an opposite end, the capacitive device configured to provide radio frequency energy to the torch, in which the torch is constructed and arranged to be operative as a second electrode, and the first electrode and the second electrode are operative to sustain a capacitively coupled plasma in the torch body is described. In certain examples, the capacitive device can be external to and around at least a portion of the torch, e.g., may contact some portion of the external surface of the torch. In some embodiments, only a single capacitive device may be present. In other instances, one end of the capacitive device can be electrically coupled to a capacitor of the oscillator and the other end can be electrically coupled to a transistor of the oscillator through an inductor.

In certain examples, the torch body can include a metal oxide such as, for example, alumina. In other examples, the first electrode is constructed and arranged as a wire coil that surrounds at least a portion of the torch. In some examples, the first electrode is constructed and arranged as a plate electrode comprising an aperture to receive at least a portion of the torch. In other examples, the first electrode is constructed and arranged as a substantially cylindrical device comprising a hollow core configured to receive at least a portion of the torch. In certain embodiments, the oscillator is air cooled. In other embodiments, the capacitive device is constructed and arranged to operate using 110-120 Volts alternating current or using a portable power source. In some examples, the device can include an additional capacitive device configured to provide radio frequency energy to the torch.

In an additional aspect, a device comprising an alumina torch comprising a substantially hollow tube comprising an inlet, an outlet and a torch body between the inlet and the outlet, and a capacitive device comprising a single electrode electrically coupled to a radio frequency energy source at one end and surrounding at least a portion of the alumina torch at an opposite end, the capacitive device configured to provide radio frequency energy from the radio frequency energy source to the torch to sustain a capacitively coupled plasma in the torch is provided. In some instances, one end of the capacitive device can be electrically coupled to a capacitor and the other end can be electrically coupled to a transistor through an inductor.

In certain embodiments, the capacitive device comprises a wire coil that surrounds at least a portion of the alumina torch. In some examples, the capacitive device comprises a plate electrode comprising an aperture configured to receive at least a portion of the alumina torch. In certain examples, the capacitive device comprises a substantially cylindrical device comprising a hollow aperture to receive at least a portion of the alumina torch. In some examples, the capacitive device is operative using a 110-120 Volts alternating current source or a portable power source, e.g., a battery, a fuel cell, a photovoltaic cell, etc. In certain embodiments, the device can include at least one additional capacitive device configured to provide radio frequency energy to the torch.

In another aspect, a plasma produced by a process comprising introducing a helium gas flow into an torch body comprising alumina and sustaining the plasma using a capacitive device configured to provide capacitive coupling to the torch body is disclosed. In certain examples, the capacitive device can be external to and around at least a portion of the torch. In some embodiments, only a single capacitive device may be present with only one end of the capacitive device electrically coupled to a radio frequency energy source.

In certain embodiments, the process can include sustaining the plasma in the absence of any substantial inductive coupling. In other embodiments, the process can include introducing the helium gas flow into the torch body at a flow rate of about 5 Liters/minute or less, e.g., about 0.5 Liters/minute or less. In additional embodiments, the process can include providing the capacitive coupling using a 110-120 Volts alternating current source or using a portable power source, e.g., a battery, fuel cell, photovoltaic cell, etc. In some embodiments, the process can include providing the capacitive coupling using a capacitive device comprising a plate electrode. In certain embodiments, the device can include configuring the torch body as an alumina torch body.

In an additional aspect, a plasma produced by a process comprising introducing a gas flow into a torch body comprising alumina and sustaining the plasma using a capacitive device configured to provide capacitive coupling to the torch body is described. In certain examples, the capacitive device can be external to and around at least a portion of the torch. In some embodiments, only a single capacitive device may be present with only one end of the capacitive device electrically coupled to a radio frequency energy source.

In certain embodiments, the process can include sustaining the plasma in the absence of any substantial inductive coupling. In other embodiments, the process can include introducing the gas flow into the torch body at a flow rate of about 0.5 Liters/minute or less. In further embodiments, the process can include providing the capacitive coupling using a 110-120 Volts alternating current source. In additional embodiments, the process can include providing the capacitive coupling using a portable power source, e.g., a battery, a fuel cell, a photovoltaic cell, etc. In some embodiments, the process can include providing the capacitive coupling using a capacitive device comprising a plate electrode. In other embodiments, the process can include providing the capacitive coupling using an air-cooled oscillator electrically coupled to the capacitive device.

In another aspect, a kit comprising a capacitive device constructed and arranged to provide capacitive coupling to sustain a plasma in a torch is provided. In some embodiments, the kit can also include a torch which may be, for example, a metal oxide torch. In some examples, the metal oxide torch can be an alumina torch. In other examples, the metal oxide torch can be a dielectric metal oxide torch. In further examples, the capacitive device can include a wire coil. In additional examples, the capacitive device comprises a plate electrode. In further examples, the capacitive device comprises a substantially cylindrical device comprising a hollow cavity. In other examples, the kit can include at least one additional capacitive device. In some embodiments, the kit can include a portable power source. In certain embodiments, the kit can include a detector. In some examples, the kit can include at least one standard.

In an additional aspect, an instrument comprising a torch comprising an inlet, an outlet and a torch body between the inlet and the outlet, a capacitive device configured to provide radio frequency energy to the torch to sustain a capacitively coupled plasma in the torch, and a detector fluidically coupled to the outlet of the torch to receive analyte is provided. In certain embodiments, the detector can be a mass spectrometer, can be configured to detect optical emission of the analyte, or can be configured to detect light absorption by the analyte. In some examples, the torch comprises an alumina torch body. In other examples, the capacitive device comprises a wire coil. In further examples, the capacitive device comprises a plate electrode. In yet additional examples, the capacitive device is operative using 110-120 Volts alternating current or a portable power source. In some embodiments, the instrument can include a condenser fluidically coupled to the torch. In other embodiments, the instrument can include a sample introduction system fluidically coupled to the torch.

In another aspect, a reactor comprising a reactor chamber, and a capacitive device configured to provide radio frequency energy to the reactor chamber to sustain a capacitively coupled plasma in the reactor chamber is described. In certain examples, the capacitive device can be external to and around at least a portion of the reactor chamber. In some embodiments, only a single capacitive device may be present with only one end of the capacitive device electrically coupled to a radio frequency energy source.

In certain examples, the capacitive device can be configured to sustain the capacitively coupled plasma in the absence of any substantial inductive coupling. In other examples, the capacitive device comprises a wire coil. In additional examples, the reactor chamber comprises alumina. In some embodiments, the capacitive device can be electrically coupled to an oscillator. In other embodiments, the capacitive device can be a substantially cylindrical device that surrounds at least a portion of the reactor chamber. In further embodiments, the capacitive device comprises a plate electrode comprising an aperture for receiving at least a portion of the reactor chamber. In some embodiments, the reactor can include an additional capacitive device configured to provide radio frequency energy to the reactor chamber. In certain examples, the additional capacitive device can be external to and around at least a portion of the reactor chamber. In other examples, the reactor can include an autosampler fluidically coupled to the reactor chamber. In some examples, the capacitive device can be constructed and arranged to operate using 110-120 Volts alternating current or using a portable power source. In other examples, the reactor chamber comprises a plurality of inlets for introducing reactants into the reactor chamber. In further examples, the reactor can include a catalyst on an inner surface of the reactor chamber. In some examples, the reactor can include a detector fluidically coupled to an outlet of the reactor. For example, the detector can be a mass spectrometer, can be configured to detect optical emission of species in the reactor chamber, can be configured to detect light absorption of species in the reactor chamber, or combinations thereof. In some examples, the reactor can include a helium gas source fluidically coupled to the reactor chamber.

In an additional aspect, a method of sustaining a capacitively coupled plasma comprising introducing a gas flow into a torch body, and providing radio frequency energy to the torch body using a capacitive device configured to sustain the capacitively coupled plasma is provided. In certain examples, the capacitive device can be external to and around at least a portion of the torch body. In some embodiments, only a single capacitive device may be present with only one end of the capacitive device electrically coupled to a radio frequency energy source.

In certain examples, the method can include sustaining the capacitively coupled plasma in the absence of any substantial inductive coupling. In other examples, the method can include configuring the gas flow as a helium gas flow at a flow rate of about 0.5 Liters/minute or less. In further examples, the method can include configuring the capacitive device as a wire coil that surround at least a portion of the torch body. In additional examples, the method can include configuring the capacitive device as a plate electrode comprising an aperture to receive at least a portion of the torch body. In some examples, the method can include configuring the torch body as an alumina torch. In other examples, the method can include sustaining the capacitively coupled plasma in the absence of an injector. In additional examples, the method can include configuring the capacitive device to be electrically coupled to an oscillator. In some examples, the method can include cooling the oscillator using ambient air. In additional examples, the method can include using a portable power source to power the capacitive device. In some embodiments, the method can include using a power source of about 500 Watts or less to power the capacitive device. In additional embodiments, the method can include using a 110-120 Volt alternating current source to power the capacitive device. In further embodiments, the method can include using an additional capacitive device to provide radio frequency energy to the torch. In some embodiments, the method can include configuring the additional capacitive device as a wire coil or configuring the additional capacitive device as a plate electrode. In additional embodiments, the method can include electrically coupling the capacitive device and the additional capacitive device to the same oscillator or to a different oscillator.

In certain embodiments, the method can include configuring the torch as an alumina torch, configuring the gas flow as a helium gas flow and configuring the capacitive device as a wire coil. In other embodiments, the method can include configuring the torch as an alumina torch, configuring the gas flow as a helium gas flow and configuring the capacitive device as a plate electrode.

In another aspect, a method of facilitating production of a capacitively coupled plasma is provided. In certain examples, the method comprises providing a capacitive device configured to provide radio frequency energy to a torch to sustain the capacitively coupled plasma in the torch. In some embodiments, the plasma can be sustained in the absence of any substantial inductive coupling. In certain examples, the capacitive device can be external to and around at least a portion of the torch body. In some embodiments, only a single capacitive device may be present with only one end of the capacitive device electrically coupled to a radio frequency energy source.

In certain examples, the method can include configuring the capacitive device to sustain the capacitively coupled plasma in the absence of any substantial inductive coupling. In some examples, the method can include providing an alumina torch. In other examples, the method can include configuring the capacitive device as a wire coil. In additional examples, the method can include configuring the capacitive device as a plate electrode. In some examples, the method can include configuring the capacitive device as a substantially cylindrical device comprising a hollow core to receive at least a portion of the alumina torch. In certain examples, the method can include providing a detector. In additional examples, the method can include providing an air-cooled oscillator configured to be electrically coupled to the capacitive device. In some examples, the method can include removing the injector from an inductively coupled plasma prior to installing the torch.

In another aspect, a device comprising an oscillator, an alumina torch comprising an inlet, an outlet and a torch body between the inlet and the outlet, a helium gas source fluidically coupled to the inlet of the alumina torch, and a capacitive device constructed and arranged with a wire coil at one end, the capacitive device electrically coupled to the oscillator at an opposite end from the wire coil, the wire coil surrounding at least a portion of the alumina torch and configured to provide radio frequency energy to the alumina torch to sustain a capacitively coupled plasma in the alumina torch is provided. In certain examples, the capacitive device can be configured to sustain the capacitively coupled in the absence of any substantial inductive coupling.

In another aspect, an oscillator for sustaining a capacitively coupled plasma in a torch body is provided. In certain embodiments, the oscillator comprise an oscillator circuit comprising a capacitor configured to support a high frequency oscillation in the circuit, and a transistor configured to drive the oscillation, in which the capacitor and the transistor are each configured to electrically couple to a capacitive device to provide capacitive energy to the torch body to sustain a capacitively coupled plasma in the torch body without substantial inductive coupling, and a power source configured to provide power to the oscillator circuit.

In some examples, the oscillator can include a feedback circuit responsive to oscillation frequency and electrically coupled to the transistor to drive the oscillation. In other examples, the transistor of the oscillation circuit is configured to electrically couple to a wire coil of the capacitive device at one end of the wire coil, and the capacitor is configured to electrically couple to the other end of the wire coil to permit transfer of capacitive energy to the torch body through the capacitive device. In certain examples, the transistor of the oscillation circuit is configured to electrically couple to a plate electrode of the capacitive device at one side of the plate electrode, and the capacitor is configured to electrically couple to the other side of the plate electrode to permit transfer of capacitive energy to the torch body through the capacitive device. In other embodiments, the power source is configured to provide a power of at least 10 kV to sustain the capacitively coupled plasma. In some instances, the oscillator circuit is further configured to work with a grounding electrode to terminate the plasma at the grounding electrode.

In an additional aspect, a system comprising a torch body, a capacitive device surrounding a portion of the torch body and configured to provide capacitive coupling to the torch body to sustain a capacitively coupled plasma in the torch body, an oscillator electrically coupled to the capacitive device and configured to drive the capacitive device, the oscillator comprising an oscillator circuit comprising a capacitor configured to support a high frequency oscillation in the circuit, and a transistor configured to drive the oscillation, in which the capacitor and the transistor are each configured to electrically couple to a capacitive device to provide capacitive energy to the torch body to sustain a capacitively coupled plasma in the torch body without substantial inductive coupling, and a power source configured to provide power to the oscillator is described.

In certain embodiments, the system can include a grounding electrode surrounding another portion of the torch body. In other embodiments, the transistor of the oscillation circuit is configured to electrically couple to a wire coil of the capacitive device at one end of the wire coil, and the capacitor is configured to electrically couple to the other end of the wire coil to permit transfer of capacitive energy to the torch body through the capacitive device. In some instances, the transistor of the oscillation circuit is configured to electrically couple to a plate electrode of the capacitive device at one side of the plate electrode, and the capacitor is configured to electrically couple to the other side of the plate electrode to permit transfer of capacitive energy to the torch body through the capacitive device. In additional examples, the power source is configured to provide a power of at least 10 kV to sustain the capacitively coupled plasma. In some embodiments, the system can include a detector fluidically coupled to the torch body. In other embodiments, the system can include a sample introduction device fluidically coupled to the torch body. In certain examples, the system can include an inductive device surrounding a portion of the torch body and configured to provide inductive coupling. In certain embodiments, the inductive device comprises at least one plate electrode or at least three plate electrodes.

In another aspect, a torch-electrode assembly comprising a hollow tube comprising an inlet, and outlet and body between the inlet and the outlet, the tube comprising a longitudinal axis and a radial axis substantially perpendicular to the longitudinal axis, and an electrode on an exterior surface of the tube and integrally coupled to the tube, the electrode comprising a length in the longitudinal direction of the tube and configured to receive capacitive energy from a power source and provide the capacitive energy to the tube to sustain a capacitively coupled plasma in the tube as a plasma gas is introduced into the inlet of the tube is provided.

In certain examples, the torch-electrode assembly comprises an aperture in the tube that is configured to receive an ignitor. In other example, the electrode comprises a plurality of windings each of which is substantially perpendicular to the longitudinal axis of the tube and substantially parallel to the radial axis of the tube, in which each of the windings contacts adjacent windings. In some embodiments, the electrode comprises a plate electrode comprising a planar surface that is substantially perpendicular to the longitudinal axis of the tube and substantially parallel to the radial axis of the tube. In additional embodiments, the assembly further comprises a grounding electrode integrally coupled to the tube.

Additional features, aspect, examples and embodiments are described in more detail below.

BRIEF DESCRIPTION OF THE FIGURES

Certain embodiments are described with reference to the figures in which:

FIG. 13A is a table showing the detection limits of various analytes, in accordance with certain examples;

FIG. 13B is a table showing the detection limits for various analytes selected from the results shown in FIG. 13A, in accordance with certain examples;

FIG. 15 is a table showing the magnesium ion to magnesium atom ratios for various types of plasmas, in accordance with certain examples;

FIG. 18 is a table showing the detection limits for chlorine and bromine using a CCP, in accordance with certain examples;

Figure 1A:
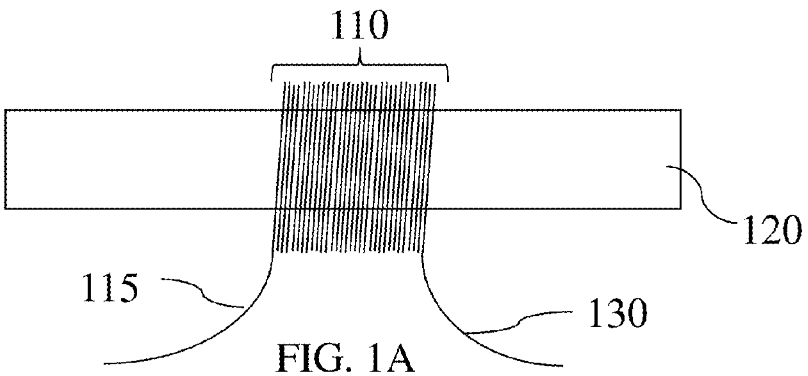
FIGS. 1A-1C are illustrations of a torch and a capacitive device, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. Where dimensions are specified in the description below, the dimensions are provided for illustrative purposes only.

DETAILED DESCRIPTION

Certain embodiments of the devices described herein can be constructed and arranged for use in sustaining capacitively coupled plasmas. While some embodiments are described as including one or more features, additional features may also be included in such embodiments without departing from the spirit and scope of the technology described herein. In addition, while certain numbers of windings are shown in the figures, the exact number of windings that may be used in a wire coil capacitive device can vary.

In certain examples, the devices and systems described herein can be configured to sustain a capacitively coupled plasma (CCP) using a single electrode. For example, a single electrode that physically contacts some portion of an exterior surface of a torch body can be used to sustain a capacitively coupled plasma within the torch. The single electrode can be used to provide radio frequency energy to a torch that receives a gas such as, for example, helium, argon, hydrogen, nitrogen or other gases. The single electrode can be positioned external to a torch or chamber such that it does not interfere with or react with species in the torch or chamber. In some examples, the capacitive coupling can be provided in the absence of any substantial inductive coupling to sustain the capacitively coupled plasma. For example, substantially no inductive coupling can be present while providing the radio frequency energy for capacitive coupling and the device may still sustain a plasma in the torch. In some instances, the CCPs can be sustained at atmospheric pressure, a pressure below atmospheric pressure or a pressure above atmospheric pressure.

Certain embodiments of a capacitive device are described below with reference to an electrode which can take various forms including a coil of wire that terminates at one end on the torch or on itself, a substantially cylindrical electrode that can surround a portion of the torch, a substantially rectangular or triangular electrode that can surround a portion of the torch or other shapes and configurations that can provide capacitive coupling can also be used, e.g., a thin planar sheet electrode similar to foil or tape can be wrapped around the circumference of the torch. In some instances, a plate electrode that comprises an aperture configured to receive a torch or chamber can be used.

In certain examples, the size, shape and temperature of the plasma sustained in the torch can vary. For example, the plasma may be about 0.5 mm to about 12 mm in diameter, more particularly about 1 mm to about 8 mm in diameter, e.g., about 2 mm to about 6 mm such as, for example, 4 mm in diameter. For comparison purposes only, a typical inductively coupled plasma may be about 23-25 mm in diameter.

In some examples, the cross-sectional shape of the plasma can vary and may be, for example, circular, elliptical, toroid or other cross-sectional shapes. Depending on the exact electrode configuration, the plasma can be substantially perpendicular to a longitudinal axis of the torch, whereas in other examples, the plasma can be tilted at an angle from perpendicular to the longitudinal axis of the torch. In certain instances, the plasma can extend in both longitudinal directions relative to placement of the electrode and may or may not be symmetric about a central radial axis of the electrode. In some examples herein, the CCP may be referred to as a mini-plasma due to its smaller size or as a mini-helium plasma due to its smaller size and that it can be sustained using a helium gas. While certain embodiments are described as using a helium gas, other gases such as argon, nitrogen, ambient air or the like could also be present or used instead of helium.

In certain embodiments, the exact configuration of the torch can vary and in certain examples the torch can include a dielectric material. In some examples, the torch can include or be made alumina, yttria, titania, quartz, silica nitride or other materials. In other embodiments, the torch can include a material that can withstand the plasma temperatures. In contrast to a typical Fassel torch used to sustain an inductively coupled plasma, the torches used in the devices described herein may be a straight bore torch that is configured as a substantially cylindrical device or tube. In some examples, the straight bore torch can include a single gas inlet at one end and a single gas outlet at an opposite end. The exact length and width of the torch can vary and may be, for example, about 0.1 mm wide to about 50 mm wide, e.g., about 0.5 mm wide to about 10 mm wide, and about 0.5 mm long to about 1 meter long. It will be recognized by the person of ordinary skill in the art, given the benefit of this disclosure, that torches of other widths and lengths can also be used, e.g., the torch may take a form similar to a small quartz, capillary GC column or may be a large cylindrical hollow tube having a length of 1 meter or greater. In addition, the torch can be optically transparent, optically opaque or may transmit a selected amount of light.

In certain examples, the devices described herein can be operative as an elemental analyzer, a chemical analyzer, a heat source, a torch, e.g., a welding torch, a cutting device, e.g., a plasma cutter, an atomization source, an ionization source, a chemical reactor, a spent fuel processing device, a light source, a portable device or other devices that commonly use a plasma or comparable state of matter. Illustrations of certain devices are provided in more detail below.

In certain embodiments, the plasma based devices described herein can include a capacitive device. The capacitive device is operative to provide radio frequency energy to the torch to sustain a capacitively coupled plasma in the torch. In some examples, the capacitive device can include an electrode electrically coupled to an oscillator. Referring to FIG. 1, the capacitive device can include an electrode 110 that is external to and coiled around a torch 120. The electrode 110 may be electrically coupled to an oscillator at one end and can be coupled to the torch at the other end, can terminate on itself or can be electrically coupled to the oscillator or ground at the other end. For example, the torch itself can be operative as another electrode of the device such that radio frequency energy provided by the electrode 110 is provided to the torch 120 to sustain a plasma in the torch 120. In contrast to existing plasma devices, which typically include two or more electrodes, the electrode 110 can be operative when it is present by itself and when it is electrically coupled to an oscillator only at one end and coupled to the torch (or itself) at an opposite end. When the second end of the electrode 110 is coupled to the torch 120, it may physically contact the torch surface or can be near the torch surface but not in contact with the torch surface. Notwithstanding the different configurations, the electrode 110 provides radio frequency energy to sustain a capacitively coupled plasma in the torch 120. In some examples, the lack of any device being present that is operative as an induction coil provides little, if any, inductive coupling. By using capacitive coupling without any substantial inductive coupling, a high voltage capacitively coupled plasma (CCP) can be sustained in the torch 120, e.g., a CCP can be sustained using 10 kV, 15 kV or higher voltages.

Figure 1B:
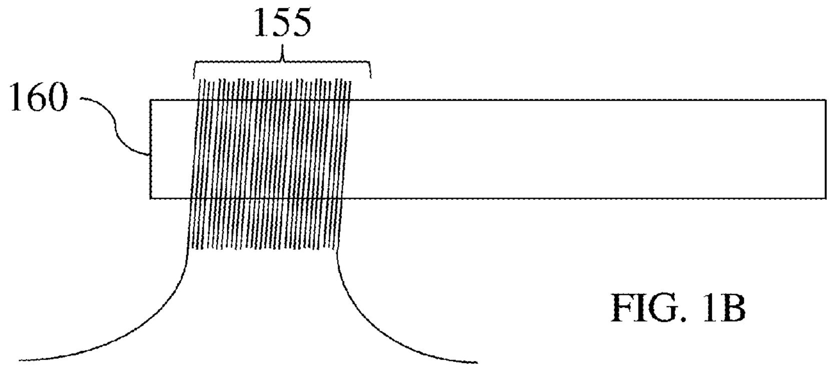
Figure 1C:
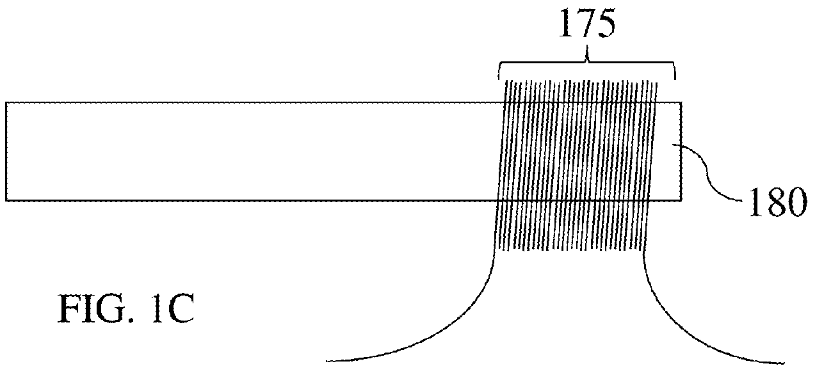

In certain examples, the electrode can be positioned at various positions along the torch. Referring to FIGS. 1B and 1C, a capacitive device 155 can be positioned adjacent a gas inlet of a torch body 160, or a capacitive device 170 can be positioned adjacent an outlet of a torch body 180, or can be positioned anywhere between the inlet 160 and the outlet 180 of the torch. Similarly, the exact number of coil windings around the torch can vary from about three to about thirty coils, more particularly about four to about twenty-five coils, e.g., about 6 coils to about 15 coils. In addition, the number of windings need not be a whole number but can be some fraction of a whole number. In some examples, the terminal end of the electrode may be in contact with one or more of the coils or may contact the torch surface, for example.

In certain embodiments, the electrodes of the capacitive device may include a plurality of windings which contact each other and the surface of the torch 120. For example, the windings can be positioned in a suitable manner such that a cylinder of wire is provided with the inner surfaces of the wire cylinder contacting the outer surfaces of the torch 120 with adjacent wire turns also contacting each other. The exact number of windings may vary from about one winding to about fifty windings, more particularly about two windings to about forty windings, e.g., about five windings to about twenty-five windings. As described herein, however, the electrodes can take other forms such as foils, tapes, cylinders or other geometric shapes and constructs.

In other instances, each of the ends or arms 115, 130 of the torch 110 can be electrically coupled to an oscillator or generator that provides capacitive coupling to the area of the torch body adjacent to the electrode. Illustrative oscillators may be found, for example, in commercially available ICP instruments available from PerkinElmer Health Sciences such as, for example, the Optima 7000 series of instruments. The oscillator can be configured to operate at about 10-50 MHz, for example, about 15-35 MHz, e.g., 20, 25, or 27 MHz. In contrast to oscillators used on existing ICP instruments, which are cooled by a chiller, the oscillators used with the capacitive device can be air cooled using a muffin fan or other suitable air flow device. In addition, the oscillator can be electrically coupled to a power supply of about 500 Watts or less. For example, a power supply designed to operate off of 110-120 Volts alternating current present in most households can be used. In other examples, a 24 Volt battery, 12 Volt battery, a photovoltaic (PV) cell or PV cell array, a fuel cell or other portable power device can be used to provide power to the oscillator. The smaller nature of the oscillator permits the use of portable power sources and can permit the plasma described herein to be used in portable, hand-held devices as described, for example, in more detail below. Also as described in more detail below, one end of the capacitive device can be electrically coupled to a high voltage capacitor of the oscillator and the other end of the capacitive device can be electrically coupled to a transistor of the oscillator.

In certain examples, the oscillator and other components of the device can be cooled using a fan or other device to provide ambient air to cool the components. The fan can be externally mounted to a housing that includes the capacitive device, the oscillator and the torch or may be mounted in the housing and include one or more air ducts or ports to permit entry and exhaust of air. If desired, cooled air can be introduced into the housing using a compressor and refrigerant or using a chiller or other cooling devices.

Figure 2:
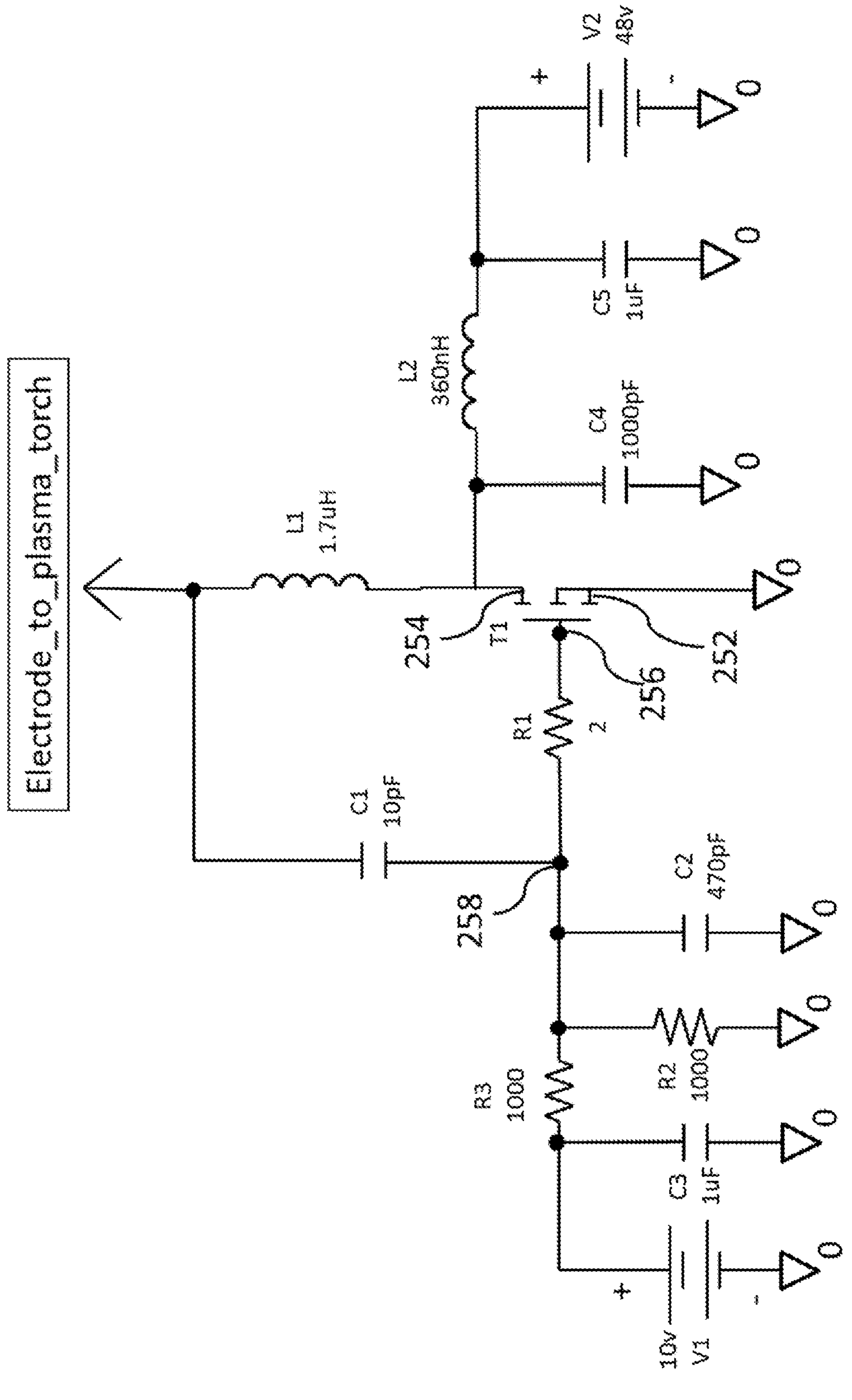
FIG. 2 is a schematic of a circuit suitable for use in providing capacitive coupling to a torch to sustain a capacitively coupled plasma, in accordance with certain examples.

In certain examples, the oscillator may comprise an oscillator circuit 200 that includes a transistor T1 (see FIG. 2). The transistor T1 includes a source terminal 252, a drain terminal 254 and a gate terminal 256. The oscillator comprises a capacitor C1 connected to the electrode (not shown), and an inductor L1 connected to the electrode through a drain terminal 254 of the transistor T1. A feedback resistor R1 is connected between an intermediate point 258 and the gate terminal 256. The source terminal 252 is grounded. A secondary capacitance can be provided by capacitor C2. A primary voltage supply V2 can include a filter formed of a bypass capacitor C5 (connected to ground), an inductor L2 connected to the drain terminal 254 of the transistor T1, and a capacitor C4 and can be used to provide electrical power to the circuit 200. A bias voltage supply can be connected to apply a DC bias voltage between the gate terminal 256 and the source terminal 252, through a voltage divider of resistors R3, R2 and capacitor C3 by a line resistance R1. The bias generally is positive, although the gate may be operated with zero voltage in some circumstances, and a bias voltage may not be needed.

In certain embodiments, the oscillator circuit may be part of a larger circuit or component that can be used to control the power provided to the plasma in the torch body. For example, the oscillator circuit can be associated with a load that utilizes power from the oscillator. In certain instances, a capacitively coupled plasma generator can be used with a torch and a plasma-forming gas such as argon, helium, nitrogen or other gases. The plasma gas can be excited to a hot plasma that provides a load on the oscillator by drawing power therefrom. The circuit can be electrically coupled to a capacitive device, e.g., a wire coil that contacts surfaces of a torch body, to capacitively couple the oscillator with the plasma-forming gas. In some instances, a controller or computer can be used to control the power provided to the plasma. The exact frequency provided by the oscillators can vary, e.g., may be in the range of 10 to 100 MHz, particularly 20-50 MHz, e.g. 27 or 40 MHz. In a typical configuration, a DC main power supply provides the primary voltage and power to the oscillator by way of a transistor, and a bias power supply can provide a gate bias voltage to the transistor. The power level delivered by the power supply is monitored, for example in the manner taught in the U.S. patent application Ser. No. 08/079,963 filed Jun. 18, 1993, which is incorporated herein by reference. Signals from the main power supply representing a power level can be passed through an analog-digital (A/D) converter to a microprocessor dedicated to controlling the oscillator or a microprocessor that is part of a larger computer system. The microprocessor with its programming can be configured to permit operation of the oscillator circuit in different modes. For example, the microprocessor can be used to determine if the oscillator should be operated in a startup mode and an operating mode. Without wishing to be bound by any particular scientific theory, different impedances may be provided by the plasma during plasma ignition as compared to when the plasma has warmed up or otherwise been sustained for some period. In one configuration, the primary voltage source provides a starting primary voltage for the startup mode, and an operating primary voltage lower than the starting primary voltage for the operating mode. Also, the bias voltage supply can provide a starting bias voltage for the startup mode, and an operating bias voltage lower than the starting bias voltage for the operating mode. If desired, a switch or relay with additional capacitors can be implemented for startup or to otherwise alter the voltage before or after plasma ignition.

In certain embodiments, the CCPs described herein can be sustained using high voltages, e.g., 5 kV, 10 kV, 15 kV or more. By providing high voltages to sustain the CCP, a plasma is produced that can include high electron temperatures (compared to the electron temperatures sustained using an inductively coupled plasma). In some instances, the electron temperatures of the CCP are at least 10%, 20%, 25%, or 30% higher than an inductively coupled plasma sustained using a helical induction coil.

In certain examples, the oscillation circuit can include one or more feedback resistors or circuits. For example, a feedback circuit responsive to oscillation frequency and electrically coupled to the transistor to drive the oscillation can be used. In some instances, a capacitive or inductive feedback responsive to the oscillation is connected to the gate terminal of the transistor T1. In some embodiments, the feedback may be capacitive or inductive. A processor or controller can be used to measure feedback and/or provide for control of the oscillator.

Figure 3A:
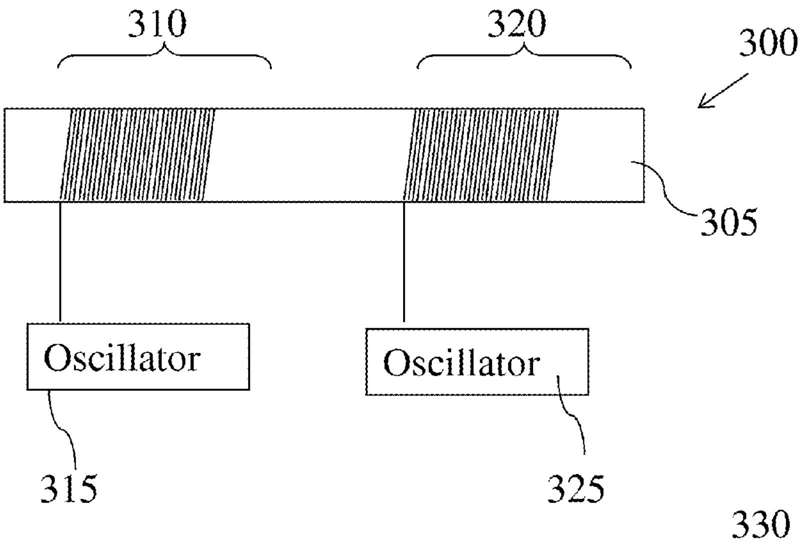
FIG. 3A is an illustration of a torch including two capacitive devices, in accordance with certain examples.

In certain embodiments, the devices and systems described herein may include two or more independent capacitive devices. Referring to FIG. 3A, a device 300 includes a first capacitive device 310 around a torch 305 and a second capacitive device 320 around the torch 305. The first capacitive device 310 is electrically coupled to a first oscillator 315, and the second capacitive device 320 is electrically coupled to a second oscillator 325. Alternatively, each of the first capacitive device 310 and the second capacitive device 320 can be electrically coupled to the same oscillator. Each of the oscillators 315 and 325 can be independently controlled such that the capacitive devices 310 and 320 provide radio frequency energy at a desired frequency, which may be the same of may be different for each of the capacitive devices 310 and 320. For example, both of the capacitive devices 310 and 320 can provide radio frequency energy from 27 MHz oscillators electrically coupled to each of the capacitive devices 310 and 320. Alternatively, one of the oscillators 315 and 325 can be operated at 27 MHz, whereas the other oscillator is operated at a different frequency, e.g., 38.5-40 MHz. The 27 MHz, 38.5 MHz and 40 MHz operation of the oscillators is merely illustrative and is not required for sustaining a capacitively coupled plasma in a torch. Similarly, different voltages can be provided to the oscillators 315, 325 to alter the overall power levels provided to the plasma within the torch 305. If desired, three or more capacitive devices can be coupled to a single torch to sustain a plasma in the torch. Any one or more of the capacitive devices can be electrically coupled to the same oscillator as another capacitive device or can be electrically coupled to different oscillators. In addition, the capacitive devices need not be the same type or kind. For example, one capacitive device can take the form of a wire coil (as shown in FIG. 3A) and the other capacitive device can be a plate electrode or other different type of capacitive device.

In certain embodiments, the capacitive devices described herein can sustain a plasma that extends bi-longitudinally from the electrode of the capacitive device. For example and referring again to FIG. 1A for reference, a CCP can be sustained in the torch 120 and can extend within the torch body to the left of the electrode 110 and to the right of the electrode 110 even where a plasma gas is generally flowing from left to right through the body of the torch 120. The CCP may be symmetric about a central plane of the electrode 110, e.g., may have C2 symmetry about a central, radial axis of the electrode 110 that is generally perpendicular to the longitudinal axis of the torch body, or may be asymmetric about the central, radial axis of the electrode 110.

Figure 3B:
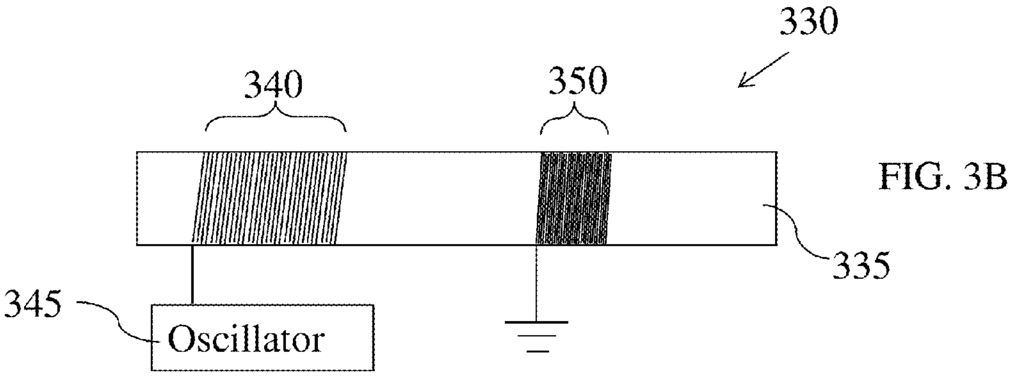
FIGS. 3B and 3C are illustrations of a torch comprising a capacitive device and a grounding electrode, in accordance with certain examples.
Figure 3C:
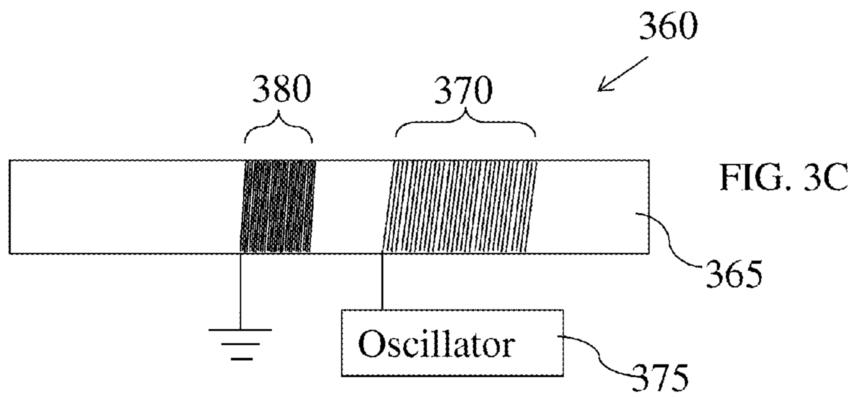

In some instances, it may be desirable to terminate the CCP in the torch so it does not extend beyond a desired point. Referring now to FIG. 3B, a capacitive device is shown comprising an electrode 340 that surrounds a torch body 335 and is electrically coupled to an oscillator 345. A grounding electrode 350 is also present and is electrically coupled to ground. In operation of the capacitive device 330, a CCP can be sustained within the torch body as capacitive coupling is provided by the electrode 340 to a plasma gas in the torch body 335. The CCP will general extend beyond the area of the torch body 335 that is adjacent to the electrode 340, e.g., to the left and to the right of the electrode 340. As the plasma encounters the area of the torch body 335 adjacent to and under the grounding electrode 350, power is removed from the plasma which acts to terminate or cut off the plasma at the site of the grounding electrode 350. In the configuration shown in FIG. 3B, the plasma gas generally flows from left to right and the grounding electrode 350 is effective to terminate the plasma downstream from the electrode 340. In a similar configuration and referring to FIG. 3C, it is possible to terminate the plasma upstream from the electrode of the capacitive device. The device 360 comprises an electrode 370 that surrounds a portion of a torch body 365 and is electrically coupled to an oscillator 375. A grounding electrode 380 is positioned upstream from the electrode 370 and is configured to terminate the plasma adjacent to and/or under the grounding electrode 380. By terminating the plasma upstream of the electrode 370, sample entering the torch body 365 can encounter a "flat" plasma face at the downstream side of the grounding electrode 380, e.g., a plasma face that is substantially perpendicular to the longitudinal axis of the torch and is radially symmetric about the longitudinal axis of the torch. While not shown, two or more grounding electrodes can also be included, e.g., one upstream and one downstream of the electrode of the capacitive device, to control the overall length of the plasma.

In certain embodiments, where the capacitive device takes the form of a coiled wire, the wire can be a copper wire, silver wire, gold wire, aluminum wire, wires formed from refractory materials (e.g., silica nitride, yttria, alumina, ceria or other materials) or wires containing two or more of these materials. The wire can include alloys, oxides or other forms of the metals to provide a desired capacitive coupling effect. The wire can include a fitting at one end to couple to the oscillator and can be terminated at an opposite end wrapping the terminal portion back onto other portions of the coil or by placing the terminal portion against the torch surface. Alternatively, the other end of the wire can be coupled to the oscillator or some component thereof, e.g., a capacitor or transistor of the oscillator. In certain instances, the electrodes of the capacitive devices described herein can be placed at a terminal portion of a torch body to extend the CCP from the torch body. For example, it may be desirable to extend the plasma outside of the torch body to position the plasma closer to a desired site within an instrument or other device. In such instances, the capacitive device can be placed adjacent to an exit terminus of the torch to sustain a CCP that is partially in the torch body and partially extends into space adjacent to the exit terminus of the torch.

Figure 4A:
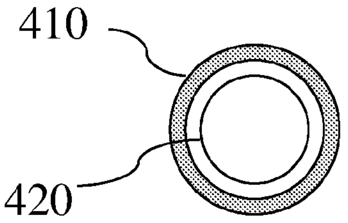
FIGS. 4A-4C are illustrations showing different cross-sectional shapes that can be present in a capacitive device, in accordance with certain examples.
Figure 4B:
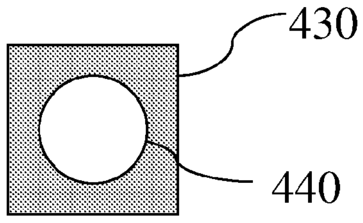
Figure 4C:
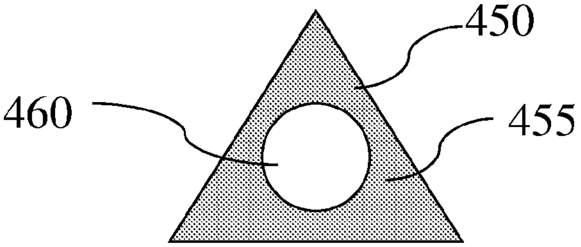

In certain examples, the electrode that provides the radio frequency energy to the torch can be constructed and arranged as devices other than coiled wires. For example, the electrode can take the form of a planar foil or tape, a cylinder, have a rectangular cross-sectional shape, a triangular cross-sectional shape or may have other geometric shape cross-sections. Referring to FIG. 4A, a cross-sectional view of a cylindrical electrode 410 that surrounds a torch 420 is shown. An external surface of the torch 420 is shown as contacting the inner surface of the cylindrical electrode 410. If desired, an air space may exist between the cylindrical electrode 410 and the torch 420. Referring to FIG. 4B, an electrode 430 having a rectangular cross-sectional shape is shown as surrounding a torch 440. The torch 440 is shown as being in contact with the electrode 430, though an air space may be present if desired. Referring to FIG. 4C, an electrode 450 having a triangular cross-sectional shape is shown as surrounding and contacting a torch 460, though an air space may be present if desired. It will be recognized by the person of ordinary skill in the art, given the benefit of this disclosure, that the length of the electrodes shown in FIGS. 4A-4C can vary. In some embodiments, the electrode length can be substantially the same as the length of the torch, whereas in other embodiments, the electrode length can be less than or greater than the length of the torch.

Figure 5:
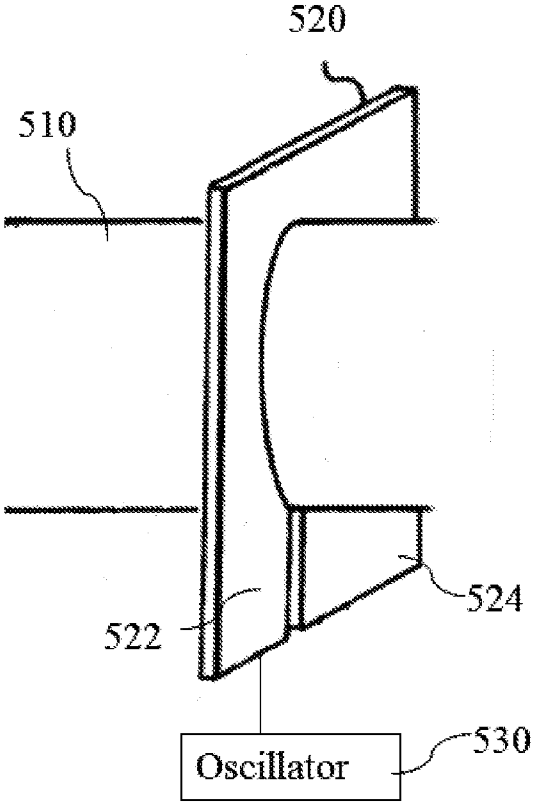
FIG. 5 is an illustration of a capacitive device configured as a plate electrode, in accordance with certain examples.

In certain examples, the electrode can take the form of a plate electrode that can sustain the capacitively coupled plasma. Referring to FIG. 5, a plate electrode 520 is shown as having an aperture that is configured to receive a torch 510. The plate electrode 520 is electrically coupled to an oscillator 530 at one side 522 and the opposite side 524 remains open or not electrically coupled to any oscillator or can be electrically coupled to the oscillator, e.g., one side of the plate can be electrically coupled to a capacitor of the oscillator and the other side of the plate can be electrically coupled to a transistor of the oscillator. In some instances, only the single plate electrode is present as a capacitive device. Radio frequency energy can be provided to the torch 510 using the plate electrode 520 to sustain a capacitively coupled plasma in the torch 510. For example, a helium gas flow of about 5 Liters/minute or less, e.g., about 1 Liter/minute or less, can be introduced into the torch 510 and after ignition, a capacitively coupled plasma can be sustained using the plate electrode 520. In addition, where two or more capacitive devices are present, the capacitive devices can be the same or can be different. For example, one capacitive device can be a plate electrode and a second capacitive device can include wire coil. Each of the capacitive devices can provide the same frequency of power, e.g., 27 MHz, 40 MHz or other desired frequency, or can provide different amounts, types or frequencies of power. In some instances, it may be desirable to use two, three or more plate electrodes as capacitive devices to sustain a capacitively coupled plasma in the torch 510. It will be within the ability of the person of ordinary skill in the art, given the benefit of this disclosure, to use a plate electrode to sustain a capacitively coupled plasma in a torch.

In certain embodiments, to generate a plasma in the torch, a gas can be introduced into an inlet of the torch. Radio frequency energy can be provided from an electrode to the torch to provide the capacitive coupling that sustains the plasma. The gas that is introduced can be an inert gas such as, for example, helium, nitrogen, hydrogen, argon or other noble gases. In certain examples, the gas is helium. The use of helium can provide several advantages including low cost (compared to the cost of argon), reduced flow rates, portability and other advantageous features. For example, the helium (or other gas) can be introduced at a flow rate of about 5 Liters/minute or less, for example about less than 4 Liters/minute, 3 Liters/minute, 2 Liters/minute, 1 Liter/minute, 0.75 Liters/minute or even 0.5 Liters/minute or less. Such flow rates can be one-tenth, one-twentieth or even one-thirtieth less than the flow rates commonly used in inductively coupled plasma devices. The device may include conventional sample introduction systems such as Meinhard nebulizers and cyclonic spray chambers. In certain examples, a straight bore torch can replace the injector as no injector is needed for proper operation of the capacitively coupled plasma, though one may be present if desired.

Figure 6A:
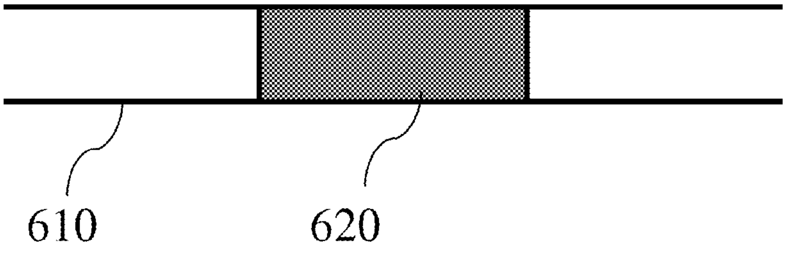
FIGS. 6A and 6B are illustrations of torches with integral electrodes, in accordance with certain examples.
Figure 6B:
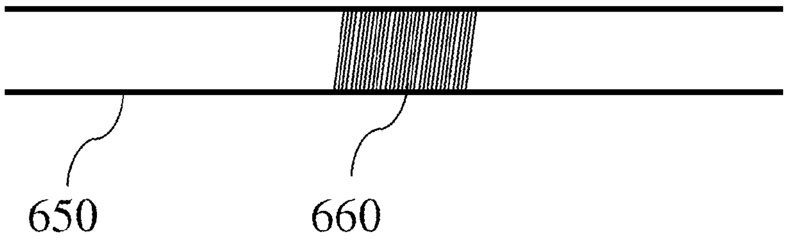

In certain examples, the torches described herein can include an integral electrode that can be electrically coupled to an oscillator or generator. For example and referring to FIG. 6A, a torch 610 comprises an integral electrode 620 which in this illustration takes the form of a foil shaped material wrapped around the outer circumference of the body of the torch 610. The integral electrode 620 may be fused to the torch 610, may be coupled to the torch 610 through an adhesive or interstitial material or may be coupled to the torch 610 in other manners which generally prevents separation of the electrode 620 from the torch 610. The electrode 620 typically includes one or more leads (not shown) to electrically couple the electrode 620 to an oscillator or generator. The particular configuration of the electrode 620 can vary. For example and referring to FIG. 6B, an integral electrode 660 is shown surrounding a torch 650. The integral electrode 660 takes the form of a plurality of wire coils each contacting adjacent coils and an outer surface of the torch 650. The electrode 660 typically includes one or more leads (not shown) to electrically couple the electrode 660 to an oscillator or generator. The electrode 660 is generally not separable from the torch 650 without damage to the torch 650. For example, the electrode 660 can be fused or otherwise coupled to the torch in a manner such that the two components are not separable without damage to the torch. In use of the integral electrodes, the electrode/torch assembly is placed into a device or instrument and then electrically coupled to the oscillator or generator. After the useful lifetime of the torch or electrode is reached, the entire electrode/torch assembly can be replaced with a new electrode/torch assembly.

In certain embodiments, the capacitively coupled plasmas described herein can be used in many different settings and in many different devices and systems. For example, the CCP can be used as a light source. In particular, the high intensity light emitted by the CCP can be directed or focused toward a certain direction to provide an intense light source having a focused beam. The light source can be used in portable settings or in a fixed setting such as a home or business. In some examples, the light source can be used to excite one or more other species. For example, the light can be used to excite chemical species that are passing through a window or are in a gas stream.

In certain examples, the CCP can be used as a chemical reactor. For example, reactants can be introduced into one or more inlets of the CCP torch, and the high temperatures of the CCP can promote a chemical reaction between the two reactants. In some examples, the CCP can be used as a chemical processing device. For example, radioactive species can be introduced into the CCP, and the high temperatures of the CCP can be used to promote conversion of the radioactive species to a more stable form. In other examples, the high temperature of the CCP can be used to study phase changes or can be used to promote atomization and/or ionization of species introduced into the CCP. The person of ordinary skill in the art, given the benefit of this disclosure, will be able to use the CCP devices for these and other chemical uses.

Figure 7A:
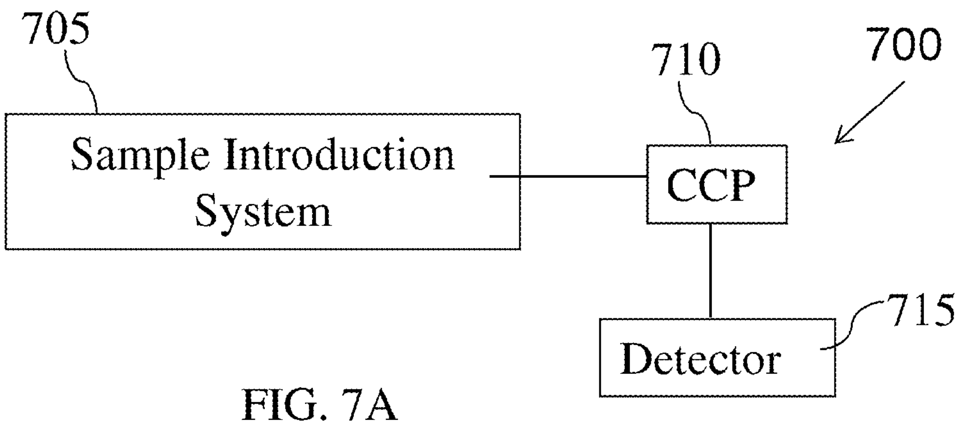
FIG. 7A is a block diagram of a generic instrument, in accordance with certain examples.

In some embodiments, the CCP devices can be used in instruments such as those instruments commonly using an inductively coupled plasma. Without wishing to be bound by any particular scientific theory, certain embodiments of the CCP devices described herein more closely mimic those properties of a flame based devices. For example, the CCP can provide good excitation, for example, because of high electron temperatures and lower gas temperatures. Unlike most flame based devices, the CCP device can be portable, is cheap to operate due to low power and low gas flow rate requirements and can provide benefits not achievable with flame based devices. Referring to FIG. 7A, a generic instrument block diagram is shown. The instrument 700 includes a sample introduction system 705 fluidically coupled to a CCP 710. The CCP 710 is fluidically coupled to a detector 715. Sample is provided from the sample introduction system 705 typically in the form of a spray or aerosol. The CCP 710 can desolvate the sample and provide it to the detector 730. Depending on the nature of the sample, the CCP 710 may also atomize and/or ionize the sample. For example, due to the substantial lack of a secondary current in certain embodiments of the CCP, when compared to a typical secondary torus that forms in an inductively coupled plasma, the CCP can have lower gas temperatures and higher electron temperatures. The higher electron temperatures can provide better excitation of sample, which can result in lower detection limits at least for certain species. In addition to the components shown in the general instrument schematic shown in FIG. 7A, additional components may be present. For example, the sample can be pre-conditioned such that a substantial amount of the solvent is removed prior to the sample reaching the CCP. Pre-conditioning can be accomplished in numerous manners including, but not limited to, the use of a condenser to remove solvent, an up-stage inductively coupled plasma stage or other means. By desolvating the sample, the likelihood of substantial lowering of the CCP temperature can be reduced.

In certain embodiments, the instrument can be configured to detect optical emission of analytes in the CCP or exiting from the CCP. As chemical species are atomized and/or ionized, the outermost electrons may undergo transitions which may emit light (potentially including non-visible light). For example, when an electron of an atom is in an excited state, the electron may emit energy in the form of light as it decays to a lower energy state. Suitable wavelengths for monitoring optical emission from excited atoms and ions will be readily selected by the person of ordinary skill in the art, given the benefit of this disclosure. Exemplary optical emission wavelengths include, but are not limited to, 396.152 nm for aluminum, 193.696 nm for arsenic, 249.772 nm for boron, 313.107 nm for beryllium, 214.440 nm for cadmium, 238.892 nm for cobalt, 267.716 nm for chromium, 224.700 nm for copper, 259.939 nm for iron, 257.610 nm for manganese, 202.031 nm for molybdenum, 231.604 nm for nickel, 220.353 nm for lead, 206.836 nm for antimony, 196.206 nm for selenium, 190.801 nm for tantalum, 309.310 nm for vanadium and 206.200 nm for zinc. The exact wavelength of optical emission may be red-shifted or blue-shifted depending on the state of the species, e.g. atom, ion, etc., and depending on the difference in energy levels of the decaying electron transition, as recognized by the person of ordinary skill in the art.

Figure 7B:
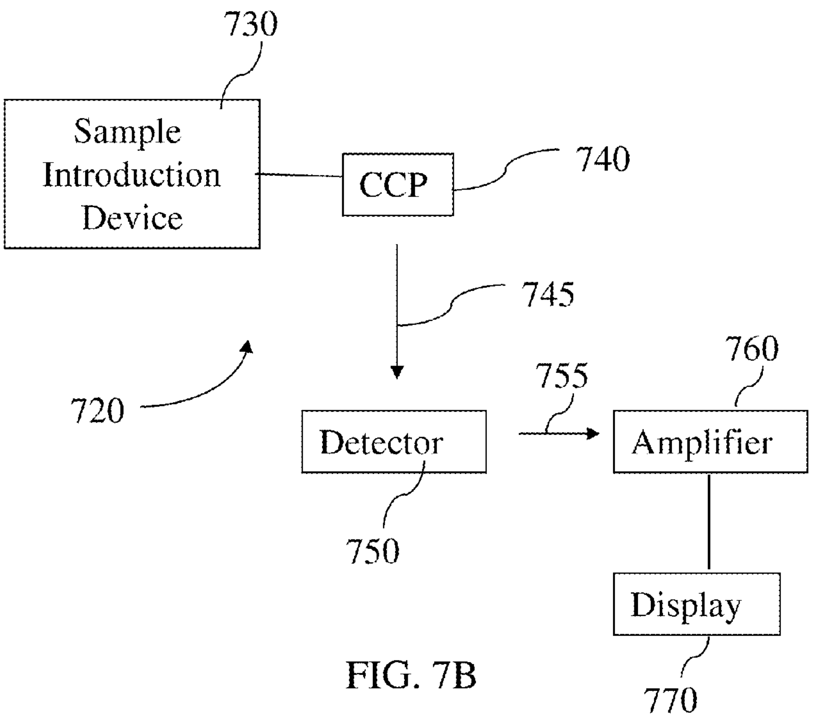
FIG. 7B is a block diagram of an optical emission device that includes a capacitively coupled plasma, in accordance with certain examples.

In certain embodiments, a schematic of an optical emission spectrometer (OES)-CCP device is shown in FIG. 7B. The device 720 includes a sample introduction system 730 fluidically coupled to a CCP 740. The CCP 740 is fluidically coupled to a detector 750. The sample introduction device 730 may vary depending on the nature of the sample. In certain examples, the sample introduction device 730 may be a nebulizer that is configured to aerosolize liquid sample for introduction into the CCP 740. In other examples, the sample introduction device 730 may be configured to directly inject sample into the CCP 740. Other suitable devices and methods for introducing samples will be readily selected by the person of ordinary skill in the art, given the benefit of this disclosure. The CCP 740 may be any one or more of the CCP's described herein, and a single capacitive device or multiple capacitive devices can be used to sustain the CCP 740. The detector 750 can take numerous forms and may be any suitable device that may detect optical emissions, such as optical emission 755. For example, the detector 750 may include suitable optics, such as lenses, mirrors, prisms, windows, band-pass filters, etc. The detector 750 may also include gratings, such as echelle gratings, to provide a multi-channel OES device. Gratings such as echelle gratings may allow for simultaneous detection of multiple emission wavelengths. The gratings may be positioned within a monochromator or other suitable device for selection of one or more particular wavelengths to monitor. In certain examples, the detector 750 may include a charge coupled device (CCD). In other examples, the OES device may be configured to implement Fourier transforms to provide simultaneous detection of multiple emission wavelengths. The detector 750 can be configured to monitor emission wavelengths over a large wavelength range including, but not limited to, ultraviolet, visible, near and far infrared, etc. The OES-CCP device 720 may further include suitable electronics such as a microprocessor and/or computer and suitable circuitry to provide a desired signal and/or for data acquisition. Suitable additional devices and circuitry are known in the art and may be found, for example, on commercially available OES devices such as Optima 2100DV series, Optima 5000 DV series and Optima 7000 series OES devices commercially available from PerkinElmer Health Sciences, Inc. (Waltham, Mass.). The optional amplifier 760 may be operative to increase a signal 755, e.g., amplify the signal from detected photons, and can provide the signal to a display 770, which may be a readout, computer, etc. In examples where the signal 755 is sufficiently large for display or detection, the amplifier 760 may be omitted. In certain examples, the amplifier 760 is a photomultiplier tube configured to receive signals from the detector 750. Other suitable devices for amplifying signals, however, will be selected by the person of ordinary skill in the art, given the benefit of this disclosure. It will also be within the ability of the person of ordinary skill in the art, given the benefit of this disclosure, to retrofit existing OES devices with the CCP devices disclosed herein and to design new OES devices using the CCP devices disclosed here. The OES-CCP devices may further include autosamplers, such as AS90 and AS93 autosamplers commercially available from PerkinElmer Health Sciences or similar devices available from other suppliers.

In certain embodiments, the CCP can be present in an instrument designed for absorption spectroscopy (AS). Atoms and ions may absorb certain wavelengths of light to provide energy for a transition from a lower energy level to a higher energy level. An atom or ion may contain multiple resonance lines resulting from transition from a ground state to a higher energy level. The energy needed to promote such transitions may be supplied using numerous sources, e.g., heat, flames, plasmas, arc, sparks, cathode ray lamps, lasers, etc., as discussed further below. In some examples, the CCP itself can be used to provide the energy or light that is absorbed by the atoms or ions. For example, a device may include a first CCP to atomize and/or ionize a sample and a second CCP to provide suitable energy that can be absorbed by the atoms and ions. Alternatively, suitable optics can be present such that a single CCP can be used for both atomization/ionization and absorption measurements. Suitable other energy sources for providing such energy and suitable wavelengths of light for providing such energy will be readily selected by the person of ordinary skill in the art, given the benefit of this disclosure.

Figure 8:
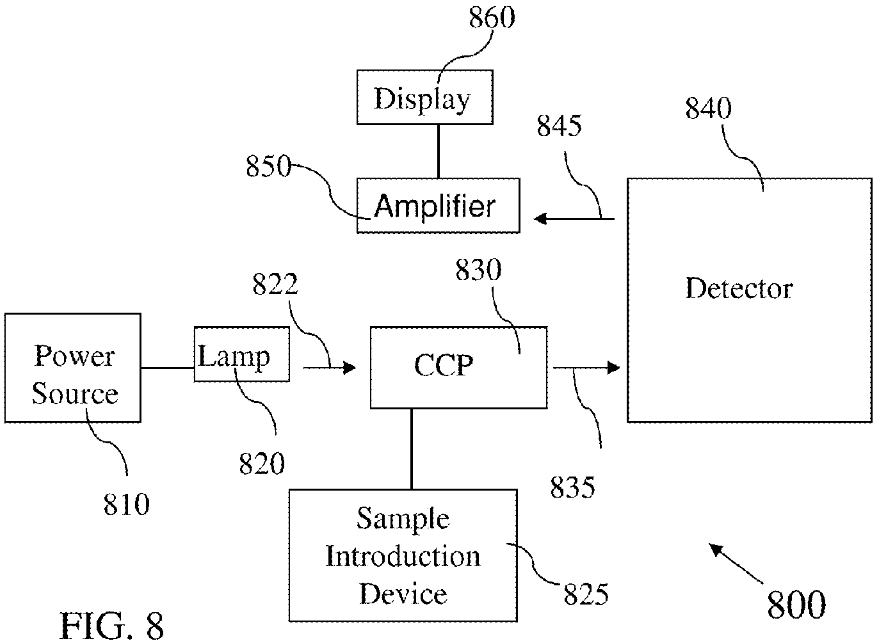
FIGS. 8 and 9 are block diagrams of absorption devices that include a capacitively coupled plasma, in accordance with certain examples.

In certain examples, a single beam AS device is shown in FIG. 8. The single beam AS device 800 includes a power source 810, a lamp 820, a sample introduction device 825, a CCP device 830, a detector 840, an optional amplifier 850 and a display 860. The power source 810 may be configured to supply power to the lamp 820, which provides one or more wavelengths of light 822 for absorption by atoms and ions. Suitable lamps include, but are not limited to mercury lamps, cathode ray lamps, lasers, etc. The lamp may be pulsed using suitable choppers or pulsed power supplies, or in examples where a laser is implemented, the laser may be pulsed with a selected frequency, e.g. 5, 10, or 20 times/second. The exact configuration of the lamp 820 may vary. For example, the lamp 820 may provide light axially along the CCP device 830 or may provide light radially along the CCP device 830. The example shown in FIG. 8 is configured for axial supply of light from the lamp 820. There can be signal-to-noise advantages using axial viewing of signals. The CCP device 830 may be any of the CCP devices discussed herein or other suitable CCP devices that may be readily selected or designed by the person of ordinary skill in the art, given the benefit of this disclosure. As sample is atomized and/or ionized in the CCP device 830, the incident light 822 from the lamp 820 may excite atoms. That is, some percentage of the light 822 that is supplied by the lamp 820 may be absorbed by the atoms and ions in the CCP device 830. The remaining percentage of the light 835 may be transmitted to the detector 840. The detector 840 may provide one or more suitable wavelengths using, for example, prisms, lenses, gratings and other suitable devices such as those discussed above in reference to the OES devices, for example. The signal may be provided to the optional amplifier 850 for increasing the signal provided to the display 860. To account for the amount of absorption by sample in the CCP device 830, a blank, such as water, may be introduced prior to sample introduction to provide a 100% transmittance reference value. The amount of light transmitted once sample is introduced into the CCP or exits from the CCP may be measured, and the amount of light transmitted with sample may be divided by the reference value to obtain the transmittance. The negative $\log_{10}$ of the transmittance is equal to the absorbance. The AS device 800 may further include suitable electronics such as a microprocessor and/or computer and suitable circuitry to provide a desired signal and/or for data acquisition. Suitable additional devices and circuitry may be found, for example, on commercially available AS devices such as AAnalyst series spectrometers commercially available from PerkinElmer Health Sciences. It will also be within the ability of the person of ordinary skill in the art, given the benefit of this disclosure, to retrofit existing AS devices with the CCP devices disclosed here and to design new AS devices using the CCP devices disclosed here. The AS devices may further include autosamplers known in the art, such as AS-90A, AS-90plus and AS-93plus autosamplers commercially available from PerkinElmer Health Sciences.

Figure 9:
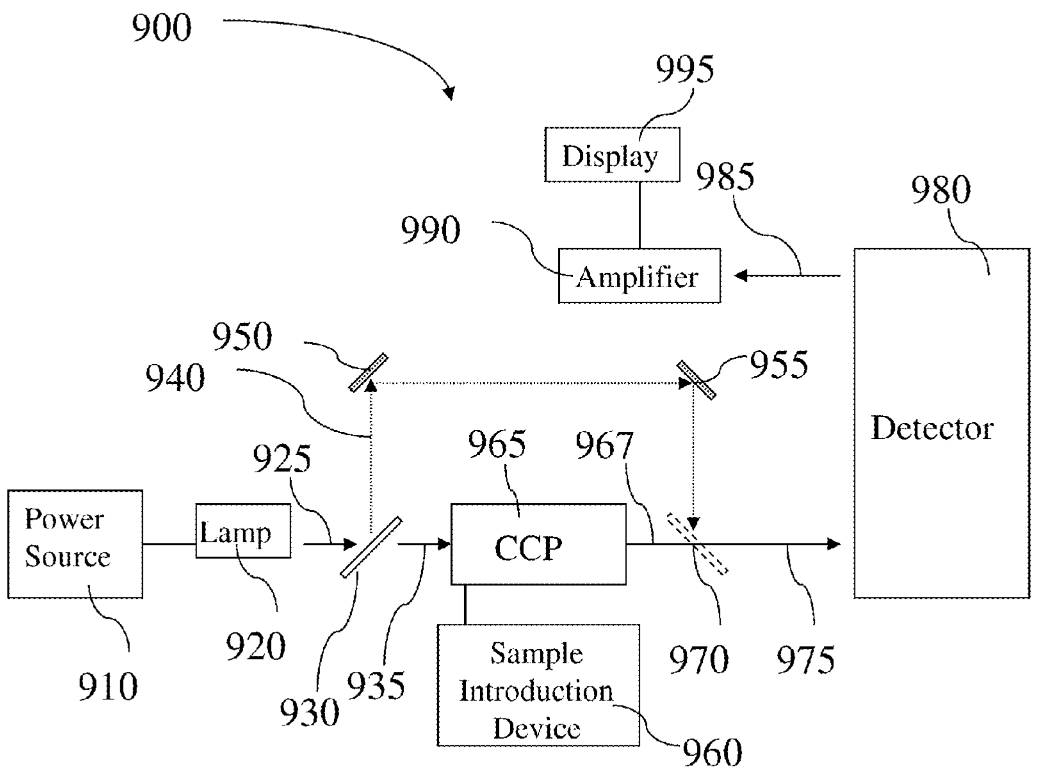

In certain embodiments and referring to FIG. 9, a dual beam AS device 900 includes a power source 910, a lamp 920, a CCP device 965, a detector 980, an optional amplifier 990 and a display 995. The power source 910 may be configured to supply power to the lamp 920, which provides one or more wavelengths of light 925 for absorption by atoms and ions. Suitable lamps include, but are not limited to, mercury lamps, cathode ray lamps, lasers, etc. The lamp may be pulsed using suitable choppers or pulsed power supplies, or in examples where a laser is implemented, the laser may be pulsed with a selected frequency, e.g. 5, 10 or 20 times/second. The configuration of the lamp 920 may vary. For example, the lamp 920 may provide light axially along the CCP device 965 or may provide light radially along the CCP device 965. The example shown in FIG. 9 is configured for axial supply of light from the lamp 920. As discussed above, there may be signal-to-noise advantages using axial viewing of signals. The CCP device 965 may be any of the CCP devices discussed herein or other suitable CCP devices that may be readily selected or designed by the person of ordinary skill in the art, given the benefit of this disclosure. As sample is atomized and/or ionized in the CCP device 965, the incident light 925 from the lamp 920 may excite atoms. That is, some percentage of the light 925 that is supplied by the lamp 920 may be absorbed by the atoms and ions in the CCP device 965. The remaining percentage of the light 967 is transmitted to the detector 980. In examples using dual beams, the incident light 925 may be split using a beam splitter 930 such that some percentage of light, e.g., about 10% to about 90%, may be transmitted as a light beam 935 to the CCP device 965, and the remaining percentage of the light may be transmitted as a light beam 940 to lenses 950 and 955. The light beams may be recombined using a combiner 970, such as a half-silvered mirror, and a combined signal 975 may be provided to the detection device 980. The ratio between a reference value and the value for the sample may then be determined to calculate the absorbance of the sample. The detection device 980 may detect one or more suitable wavelengths using, for example, prisms, lenses, gratings and other suitable devices known in the art, such as those discussed above in reference to the OES devices, for example. Signal 985 may be provided to the optional amplifier 990 for increasing the signal for provide to the display 995. The AS device 900 may further include suitable electronics known in the art, such as a microprocessor and/or computer and suitable circuitry to provide a desired signal and/or for data acquisition. Suitable additional devices and circuitry may be found, for example, on commercially available AS devices such as AAnalyst series spectrometers commercially available from PerkinElmer Health Sciences, Inc. It will be within the ability of the person of ordinary skill in the art, given the benefit of this disclosure, to retrofit existing dual beam AS devices with the CCP devices disclosed here and to design new dual beam AS devices using the CCP devices disclosed here. The AS devices may further include autosamplers known in the art, such as AS-90A, AS-90plus and AS-93plus autosamplers commercially available from PerkinElmer Health Sciences, Inc.

Figure 10:
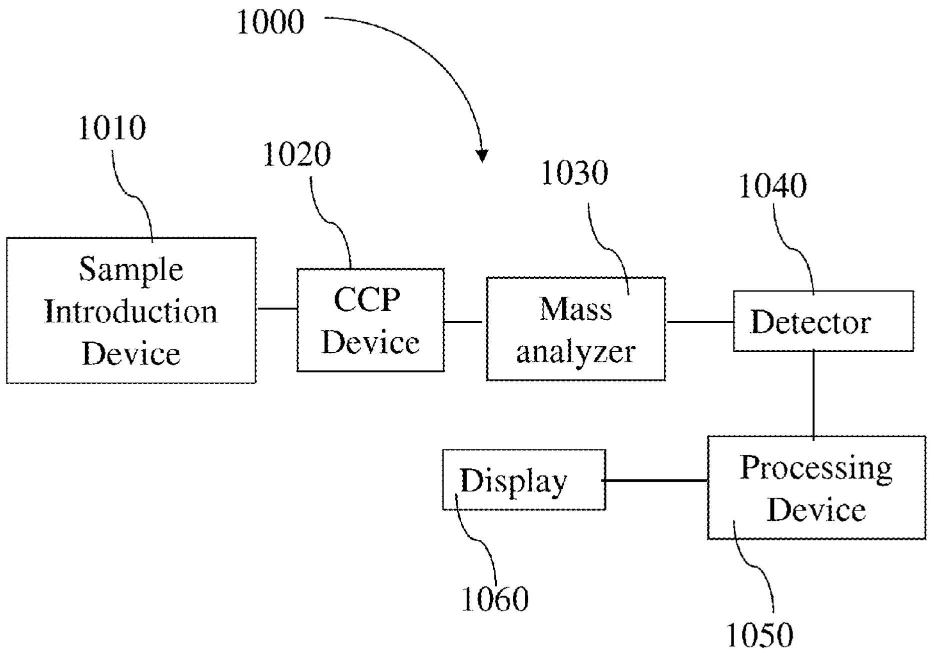
FIG. 10 is a block diagram of a mass spectrometer that includes a capacitively coupled plasma, in accordance with certain examples.

In certain examples, a device for mass spectroscopy (MS) that includes a CCP device is schematically shown in FIG. 10. The MS device 1000 includes a sample introduction device 1010, a CCP device 1020, a mass analyzer 1030, a detector 1040, a processing device 1050 and a display 1060. The sample introduction device 1010, the CCP device 1020, the mass analyzer 1030 and the detector 1040 may be operated at reduced pressures using one or more vacuum pumps. In certain examples, however, only the mass analyzer 1030 and the detector 1040 may be operated at reduced pressures. The sample introduction device 1010 may include an inlet system configured to provide sample to the CCP device 1020. The inlet system may include one or more batch inlets, direct probe inlets and/or chromatographic inlets. The sample introduction device 1010 may be an injector, a nebulizer or other suitable devices that may deliver solid, liquid or gaseous samples to the CCP device 1020. The CCP device 1020 may be any one or more of the CCP devices discussed herein. As discussed herein, the CCP device 1020 may include two or more capacitive devices, for example. The mass analyzer 1030 may take numerous forms depending generally on the sample nature, desired resolution, etc. and exemplary mass analyzers are discussed further below. The detector 1040 may be any suitable detection device that may be used with existing mass spectrometers, e.g., electron multipliers, Faraday cups, coated photographic plates, scintillation detectors, etc., and other suitable devices that will be selected by the person of ordinary skill in the art, given the benefit of this disclosure. The processing device 1050 typically includes a microprocessor and/or computer and suitable software for analysis of samples introduced into MS device 1000. One or more databases may be accessed by the processing device 1050 for determination of the chemical identity of species introduced into MS device 1000. Other suitable additional devices known in the art may also be used with the MS device 1000 including, but not limited to, autosamplers, such as AS-90plus and AS-93plus autosamplers commercially available from PerkinElmer Health Sciences, Inc.

In certain embodiments, the mass analyzer of MS device 1000 may take numerous forms depending on the desired resolution and the nature of the introduced sample. In certain examples, the mass analyzer is a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that may separate species with different mass-to-charge ratios. The CCP devices disclosed herein may be used with any one or more of the mass analyzers listed above and other suitable mass analyzers. In certain examples, the CCP device in an MS device is a helium-CCP that is sustained using a helium gas flow and one or more capacitive devices.

In certain other examples, the CCP devices disclosed here may be used with existing ionization methods used in mass spectroscopy. For example, electron impact sources in combination with a CCP device may be assembled to increase ionization efficiency prior to entry of ions into the mass analyzer. In other examples, chemical ionization sources in combination with a CCP device may be assembled to increase ionization efficiency prior to entry of ions into the mass analyzer. In yet other examples, field ionization sources in combination with a CCP device may be assembled to increase ionization efficiency prior to entry of ions into the mass analyzer. In still other examples, the CCP devices may be used with desorption sources such as, for example, those sources configured for fast atom bombardment, field desorption, laser desorption, plasma desorption, thermal desorption, electrohydrodynamic ionization/desorption, etc. In yet other examples, the CCP devices may be configured for use with thermospray ionization sources, electrospray ionization sources or other ionization sources and devices commonly used in mass spectroscopy. It will be within the ability of the person of ordinary skill in the art, given the benefit of this disclosure, to design suitable devices for ionization including CCP devices for use in mass spectroscopy and other applications.

In some embodiments, the MS devices disclosed here may be hyphenated with one or more other analytical techniques. For example, MS devices may be hyphenated with devices for performing liquid chromatography, gas chromatography, capillary electrophoresis, and other suitable separation techniques. When coupling an MS device that includes a CCP device with a gas chromatograph, for example, it may be desirable to include a suitable interface, e.g., traps, jet separators, etc., to introduce sample into the MS device from the gas chromatograph. When coupling an MS device to a liquid chromatograph, it may also be desirable to include a suitable interface to account for the differences in volume used in liquid chromatography and mass spectroscopy. For example, split interfaces may be used so that only a small amount of sample exiting the liquid chromatograph may be introduced into the MS device. Sample exiting from the liquid chromatograph may also be deposited in suitable wires, cups or chambers for transport to the CCP device of the MS device. In certain examples, the liquid chromatograph may include a thermospray configured to vaporize and aerosolize sample as it passes through a heated capillary tube. In some examples, the thermospray may include its own CCP device to increase ionization of species using the thermospray. Other suitable devices for introducing liquid samples from a liquid chromatograph into a MS device will be readily selected by the person of ordinary skill in the art, given the benefit of this disclosure. In certain examples, MS devices, at least one of which includes a CCP device, are hyphenated with each other for tandem mass spectroscopy analyses. For example, one MS device may include a first type of mass analyzer and the second MS device may include a different or similar mass analyzer as the first MS device. In other examples, the first MS device may be operative to isolate the molecular ions, and the second MS device may be operative to fragment/detect the isolated molecular ions. In additional embodiments, three or more MS devices may be coupled to each other. It will be within the ability of the person of ordinary skill in the art, given the benefit of this disclosure, to design hyphenated MS/MS devices at least one of which includes a CCP device.

In certain examples, the CCP devices described herein can be used in portable devices. In particular, the lower power requirements and reduced gas flow rates of certain embodiments can permit the use of CCP devices in settings not possible with most other plasma based devices. For example, the CCP can be powered using a portable power source such as a fuel cell, a battery, a photovoltaic (PV) cell or PV cell array, an electrochemical cell or other suitable power sources that are designed to be moved easily from one place to another place. In addition, the minimal gas requirements to sustain the plasma mitigates any requirements of large gas cylinders or other cumbersome gas storage devices. For example, a small portable gas cylinder similar to the size of a small propane tank, e.g., a 1 liter tank, a 1-gallon tank or a 5-gallon tank, can be filled with helium or other suitable gas. The gas cylinder can be fluidically coupled to a torch comprising a capacitive device to sustain a plasma in the torch. The sustained plasma can be used in field analyses such as soil analysis, hydrocarbon fluid analysis, or other chemical tests commonly performed in non-laboratory settings.

In some examples, the CCP device can be configured as a sensor that can detect the presence of a particular substance or if a particular substance is present above a certain level. For example, a CCP device can be placed in a desired area of an industrial facility and may periodically monitor gases to determine if species in the air are present above an unsafe level or certain non-desired species are present in the air. Similarly, in-line fluid analyses can be performed using the CCP devices where a small amount of fluid in an industrial facility is periodically sampled (either manually or automatically) and analyzed using a CCP device. The smaller size and power needs of the CCP devices permits the use of many CCP devices at reduced overall cost.

In addition to the uses of the CCP devices described herein, the CCP devices can be used in other settings where flames or plasmas are commonly encountered. For example, the CCP can be used in welding torches, in plasma cutters, in processing devices that use high temperatures, as a heat source, as a light source or other uses. In some embodiments, the CCP devices can be used as a reactor to promote chemical reactions, process exhaust gases, process spent fuels or the like. For example, partially combusted exhaust gases can be introduced into the reactor to promote further degradation or oxidation to a more environmentally friendly form. Similarly, spent nuclear fuels can be introduced into the reactor to promote formation of a more stable form. In certain embodiments, the reactor can include one or more inlets for introducing species in the reactor. For example, chemical reactants can be introduced into the reactor and a CCP in the reactor can promote reaction between the chemical reactants. The products from the reaction can flow out of the reactor in the plasma stream and be collected and isolated in one or more other containers.

In certain examples, a plasma can be produced by a process comprising introducing a gas flow into a torch body, e.g., a torch body comprising alumina, and sustaining the plasma using a capacitive device configured to provide capacitive coupling to the torch body. In some examples, the process can include sustaining the plasma in the absence of any substantial inductive coupling. In other examples, the process can include introducing the gas flow into the torch body at a flow rate of about 0.5 Liters/minute or less. In further examples, the process can include providing the capacitive coupling using a 110-120 Volts alternating current source. In additional examples, the process can include providing the capacitive coupling using a portable power source. In some examples, the portable power source can be a battery, a fuel cell, a photovoltaic cell, an electrochemical cell or other portable power sources. In some embodiments, the process can include providing the capacitive coupling using a capacitive device comprising a plate electrode. In additional embodiments, the process can include providing the capacitive coupling using an air-cooled oscillator electrically coupled to the capacitive device.

In certain embodiments, a kit can be used, for example, to sustain a CCP. The kit can include, for example, one or more desirable components to retrofit existing plasma devices such that those devices can be used to sustain a CCP. In some embodiments, the kit can include a capacitive device constructed and arranged to provide capacitive coupling to sustain a plasma in the metal oxide torch. In certain examples, the kit can also include torch such as, for example, a metal oxide torch. In some embodiments, the metal oxide torch can be an alumina torch. In other embodiments, the metal oxide torch can be a dielectric metal oxide torch. In certain examples, the capacitive device can include a wire coil, can be a plate electrode or can be other capacitive devices such as, for example, a substantially cylindrical device comprising a hollow cavity. In some examples, the kit can include at least one additional capacitive device. In other examples, the kit can include a portable power source. In further examples, the kit can include a detector.

In certain embodiments, a method of sustaining a capacitively coupled plasma can be performed. The method can include, for example, introducing a gas flow into a torch body, and providing radio frequency energy to the torch body using a capacitive device configured to sustain the capacitively coupled plasma. The capacitive device may take the form of any of the capacitive devices described herein. In some embodiments, the method can also include sustaining the capacitively coupled plasma in the absence of any substantial inductive coupling. In some examples, the method can include configuring the gas flow as a helium gas flow at a flow rate of about 0.5 Liters/minute or less. In other examples, the method can include configuring the torch body as an alumina torch. In further examples, the method can include sustaining the capacitively coupled plasma in the absence of an injector. In additional embodiments, the method can include configuring the capacitive device to be electrically coupled to an oscillator. In some instances, only a single electrode can be used. In other embodiments, the method can include cooling the oscillator using ambient air. In some examples, the method can include using a portable power source to power the capacitive device. In additional examples, the method can include using a power source of about 500 Watts or less to power the capacitive device. In yet other examples, the method can include using a 110-120 Volts alternating current source to power the capacitive device. In some examples, the method can include using an additional capacitive device to provide radio frequency energy to the torch. In further examples, the method can include configuring the additional capacitive device as a wire coil, a plate electrode or other types of capacitive devices. In some embodiments, the method can include electrically coupling the capacitive device and the additional capacitive device to the same oscillator. In further embodiments, the method can include electrically coupling each of the capacitive device and the additional capacitive device to a different oscillator.

In some examples, the method can include configuring the torch as an alumina torch, configuring the gas flow as a helium gas flow and configuring the capacitive device as a wire coil. In certain examples, only a single wire coil electrode may be present. In other examples, the method can include configuring the torch as an alumina torch, configuring the gas flow as a helium gas flow and configuring the capacitive device as a plate electrode. In certain examples, only a single plate electrode may be present.

In certain embodiments, a method of facilitating production of a capacitively coupled plasma can be performed. For example, the method can include providing a capacitive device configured to provide radio frequency energy to a torch to sustain the capacitively coupled plasma in the torch. In some examples, the capacitive device is configured to sustain the capacitively coupled plasma in the absence of any substantial inductive coupling. In some embodiments, the method can include providing an alumina torch. In other embodiments, the method can include configuring the capacitive device as a wire coil. In additional embodiments, the method can include configuring the capacitive device as a plate electrode. In further embodiments, the method can include configuring the capacitive device as a substantially cylindrical device comprising a hollow core to receive at least a portion of the alumina torch. In some examples, the method can include providing a detector. In other embodiments, the method can include providing an air-cooled oscillator configured to be electrically coupled to the capacitive device. In further embodiments, the method can include removing the injector from an inductively coupled plasma prior to installing the torch.

Figure 11:
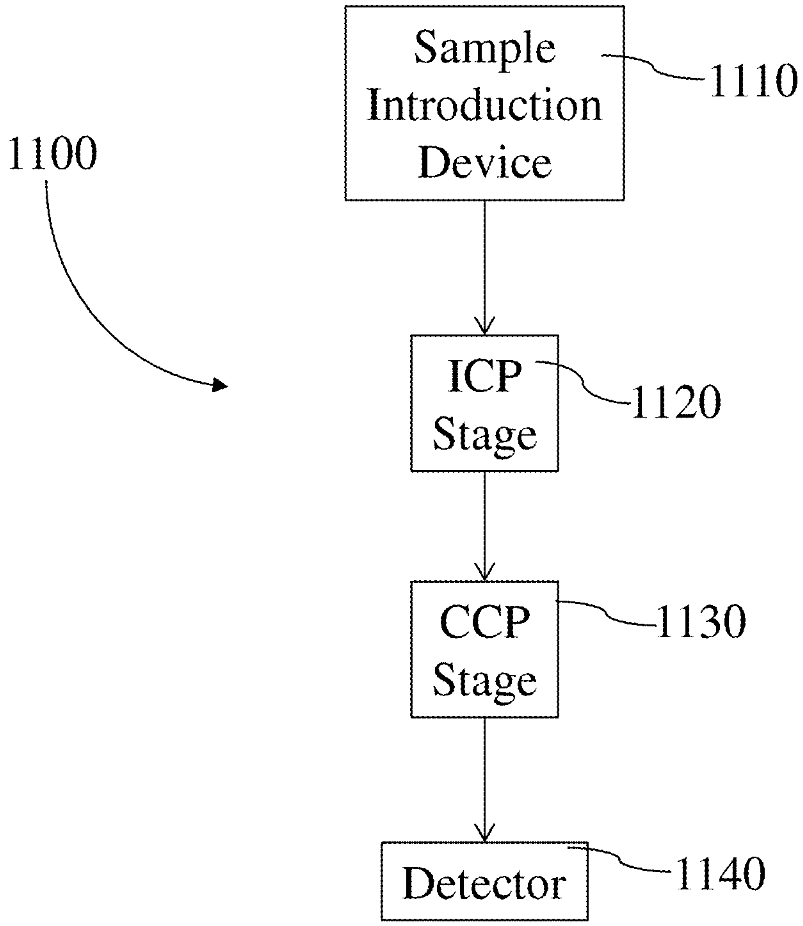
FIG. 11 is a block diagram of an instrument comprising an ICP stage and a CCP stage, in accordance with certain examples.

In certain embodiments, the CCPs described herein, and the devices used to generate them, can be used in combination with an inductively coupled plasma. For example, it may be desirable to use a first stage comprising an inductively coupled plasma and a second stage comprising a CCP. The first stage can be used to desolvate a sample, and the desolvated sample can be provided from the first stage to the CCP of the second stage for atomization and/or ionization. A schematic of such a system is shown in FIG. 11. The system 1100 comprises a sample introduction system 1110, an ICP stage 1120, a CCP stage 1130 and a detector 1140. The sample introduction device 1110 provides sample to the ICP stage 1120. The ICP stage 1120 can desolvate and/or atomize/ionize species in the sample and provide those species to the CCP stage 1130, which can atomize and/or ionize the received species. The ICP stage 1120 and CCP stage 1130 may share a common torch or may comprise separate torches. Where separate torches are used, one or more interfaces can be present between the ICP stage 1120 and the CCP stage 1130 or the two torches may be fluidically coupled without the use of an interface. The CCP stage 1130 can provide species to the detector 1140, which may be any of the detectors, or components thereof, described herein, e.g., a mass spectrometer, OES detector, AAS detector or other detectors. If desired, the CCP stage 1130 can be placed between the sample introduction device 1110 and the ICP stage 1120 so sample is first incident on the CCP stage 1130. Sample may then be provided to a downstream ICP stage.

In certain embodiments, the oscillators and devices described herein can be used in a dedicated element detector. For example, the oscillators described herein can be produced at substantially lower cost than an oscillator commonly used with inductively coupled plasma. The lower cost permits design of dedicated elemental analyzers which can be used to analyze one or a few elements. Illustrative elemental analyzers include those configured to detect one or more metals or non-metals, e.g., nitrogen, sulfur, halogens such as fluorine, chlorine, bromine and iodine, or other elements. In some instances, the CCP can be coupled to an element-selective detector to provide atomized and/or ionized elements to the element-selective detector, e.g., the CCP can be fluidically coupled to a pulsed flame photometric detector (PFPD) configured to measure one of sulfur or carbon or nitrogen, for example. The selective elemental analyzer may be fluidically coupled to a chromatography device, e.g. a gas chromatography device, a liquid chromatography device or other chromatography devices to separate the species in a sample.

Certain specific examples of CCP devices and configurations of devices used to sustain CCPs are described below to illustrate further some of the uses of the technology described herein.

Example 1

Figure 12:
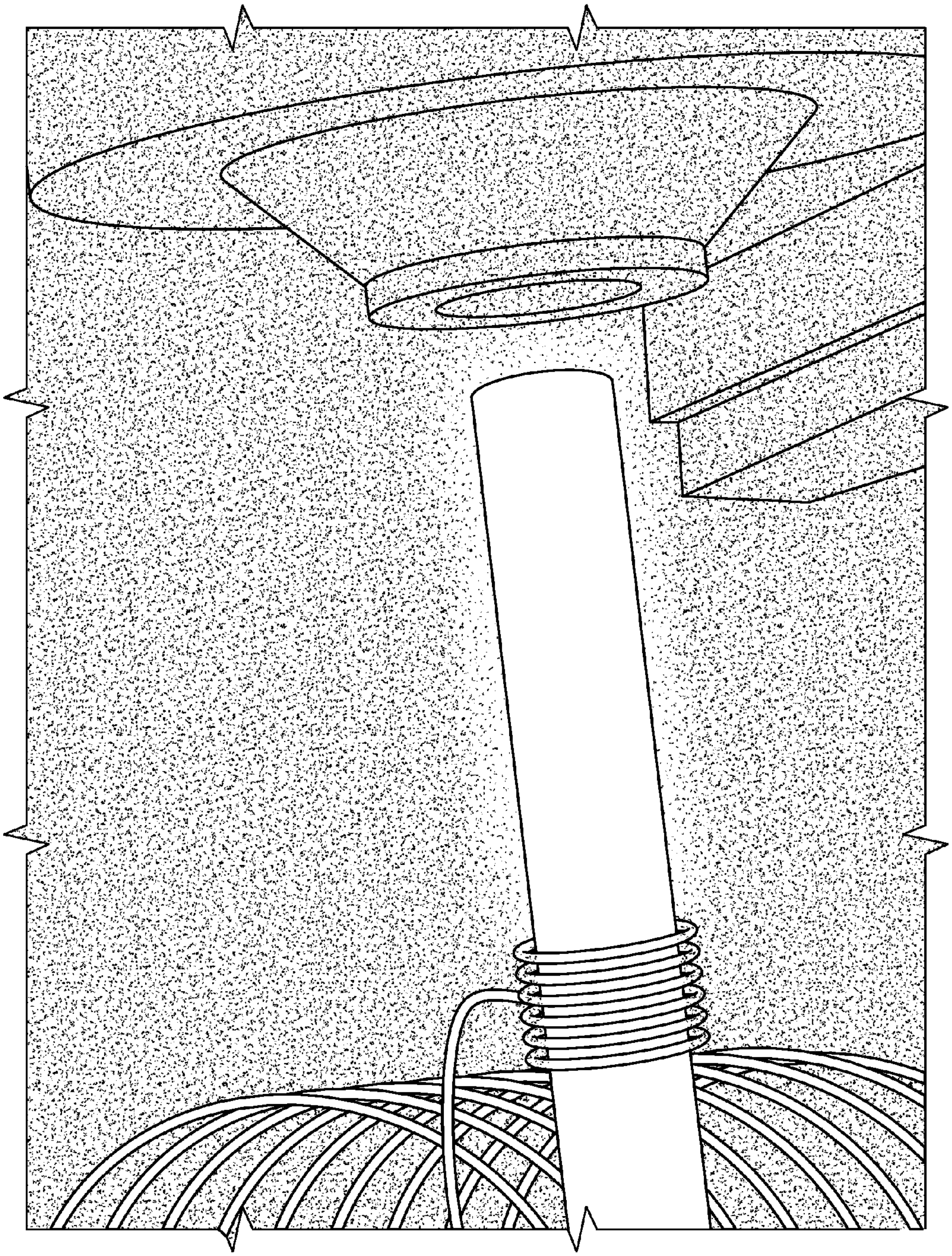
FIG. 12 is a line drawing produced from a photograph of a capacitively coupled plasma, in accordance with certain examples.

A capacitively coupled plasma was generated and sustained using a modified Optima 7000 OES instrument. A 27 MHz oscillator, with an oscillator circuit as shown in FIG. 2, was placed inside of the Optima 7000 OES instrument. The torch mount and the sample introduction system were standard and used unmodified. A straight bore alumina tube was used as the CCP torch. The alumina tube replaced the injector of the Optima 7000 instrument. Radio frequency energy was coupled to the alumina tube using a single copper wire that was wrapped around and contacted the alumina tube (see FIG. 12). Ambient air was blown through the honeycomb at the bottom of the torch compartment using a muffin fan to cool the oscillator. The power to the oscillator was provided through a modified front door assembly and controlled by a DC power supply. Helium gas was introduced at a flow rate of about 0.5 Liters/minute. A pump rate of 2 mL/minute, and a power of 30 Volts (14 A) was used to sustain the plasma. A line drawing produced from a photograph of the sustained CCP and the wire coil capacitive device is shown in FIG. 12.

Example 2

Numerous analytes were injected into the CCP device of Example 1 and detection limits were measured (see FIG. 13A) using the existing OES detector in the Optima 7000 instrument. The standard that was used was 1 ppm QC-21 in 1% nitric acid. Blank measurements were made using deionized water. Two different sample introduction systems were used: (1) a Type C Meinhard nebulizer and cyclonic spray chamber, and (2) an ultrasonic nebulizer (USN). Both 40 MHz and 27 MHz radio frequency energy was used. For comparison purposes, the detection limits of the analytes were also measured using the standard Optima 7000 setup and an inductively coupled plasma.

It was observed that the ICP favored ionic lines and the CCP favored atomic lines. For comparison purposes, certain results were selected from the table of FIG. 13A and are reproduced in FIG. 13B to compare favorable elements for the CCP and the ICP. The results are consistent with the CCP having lower detection limits for certain elements, and the ICP having lower detection limits for other elements.

Example 3

Figure 14:
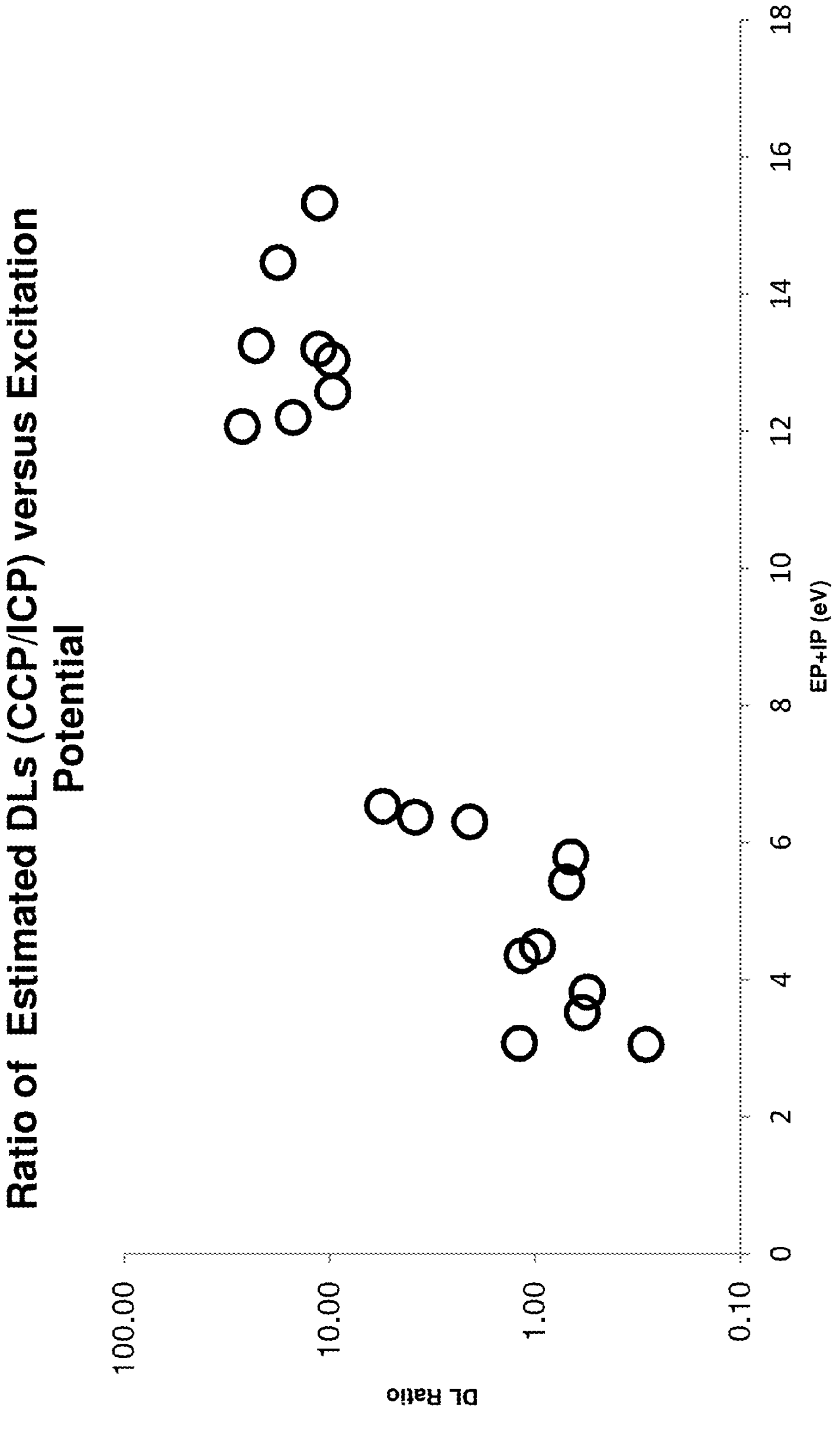
FIG. 14 is a graph of detection limit ratios versus excitation potential, in accordance with certain examples.

To better understand the differences in the CCP and ICP detection limits, a plot of the CCP/ICP ratio of estimated detection limits versus excitation potential was created and is shown in FIG. 14. For those elements tested, the CCP was observed to provide lower detection limits for elements with lower excitation potentials. In some cases, the detection limits for low excitation potential atomic lines can be ten times better than conventional ICP detection limits. Similarly, detection limits for high excitation potential ion lines can be worse when using a CCP as compared to the detection limits observed with an ICP.

The ratio of magnesium ion to magnesium atoms for each of the plasmas was calculated and is shown in FIG. 15. The CCP's favoring of atomic lines reduces the ion/atom ratio as compared to the ratio observed when using an ICP.

Figure 16:
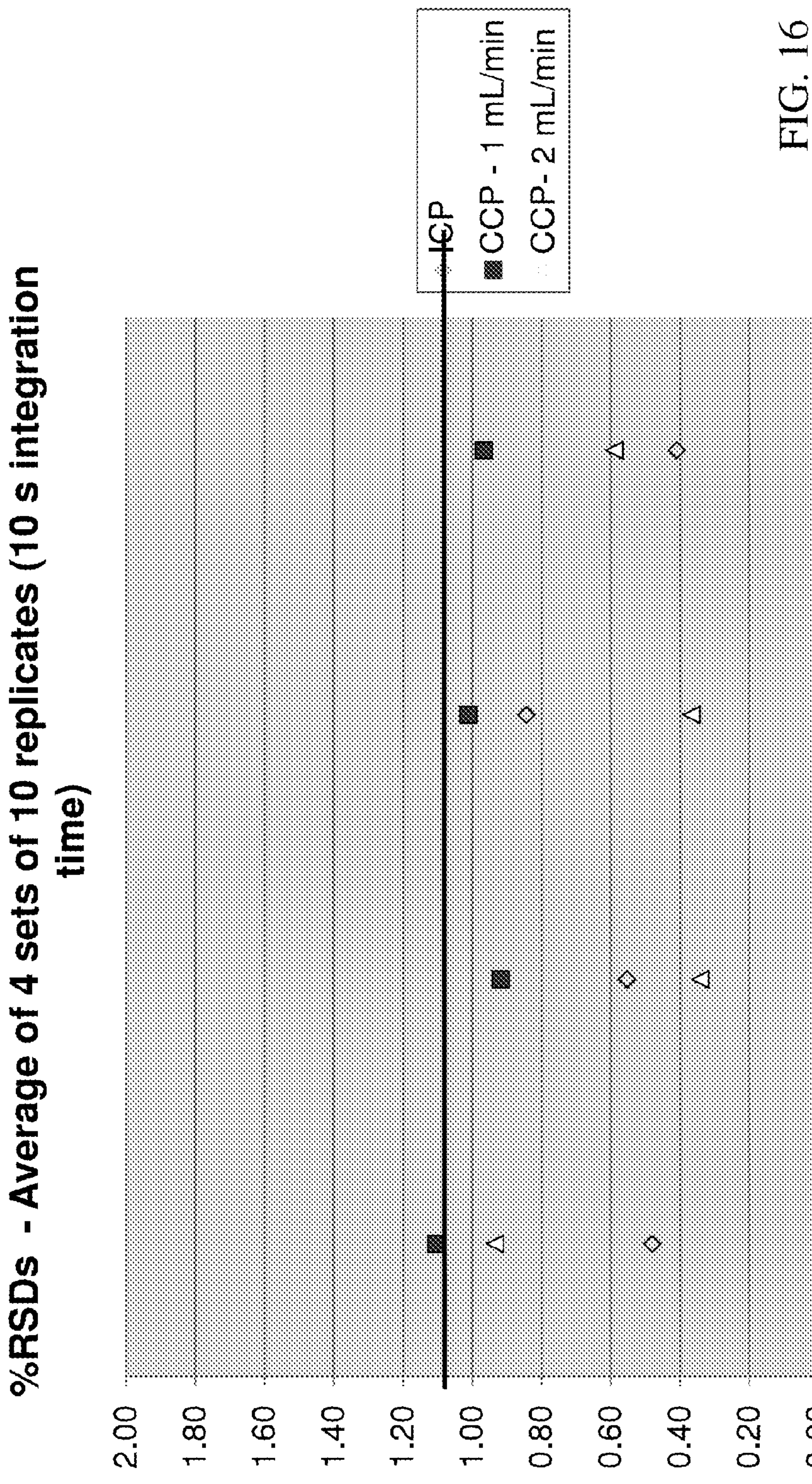
FIG. 16 is a graph showing the relative standard deviation of certain analytes in various types of plasmas, in accordance with certain examples.

To determine how precise the measurements were using a CCP, 4 sets of 10 replicates were analyzed using an ICP device and the CCP device at two different flow rates. The results are shown in the graph of FIG. 16. Precision with the CCP was found to be comparable to that of the ICP.

Example 4

Figure 17:
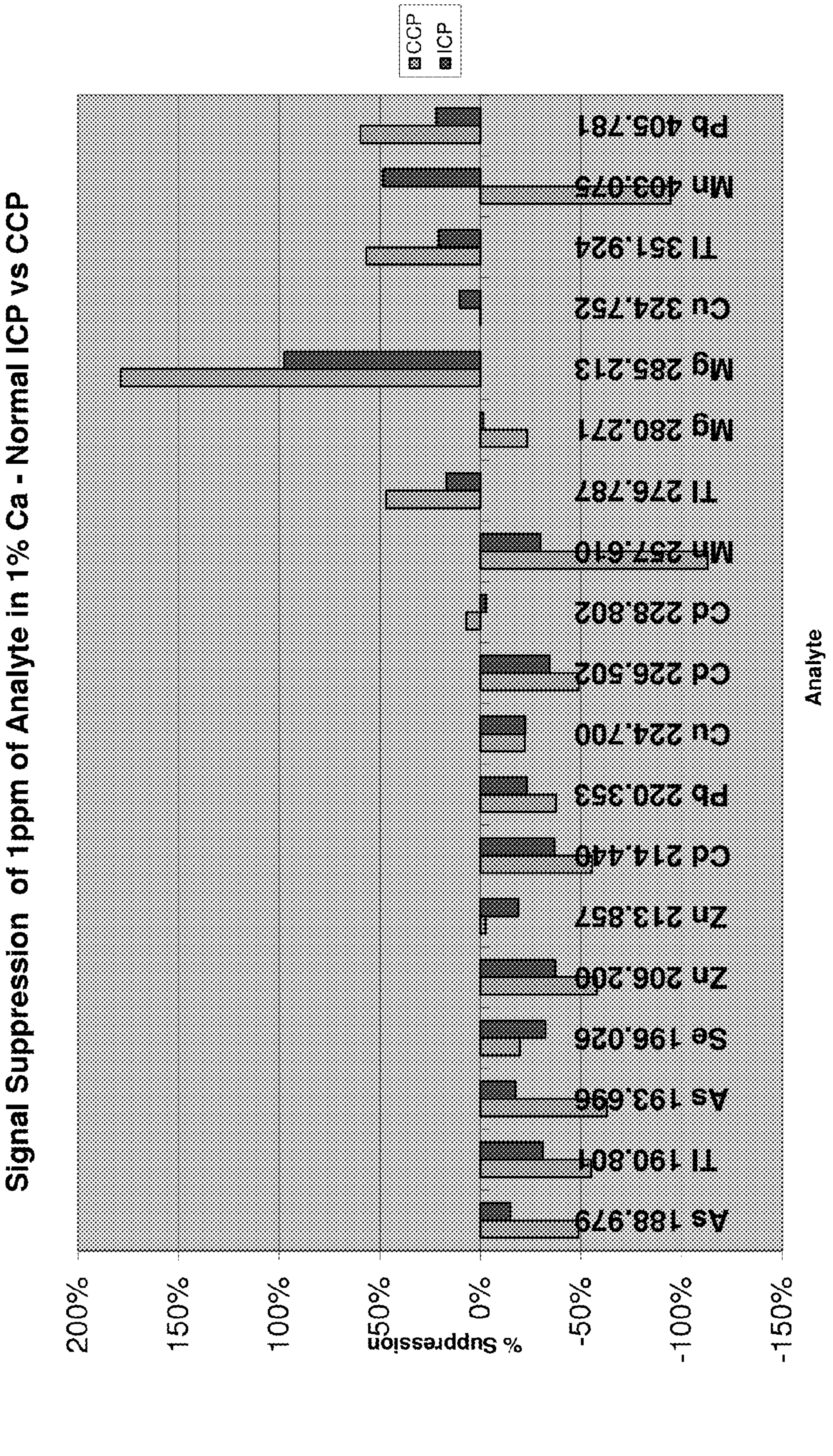
FIG. 17 is a graph showing the signal suppression of various analytes in different types of plasmas, in accordance with certain examples.

To determine whether the CCP performance was altered by matrix effects, measurements were performed to ascertain the percentage suppression of the signal by the matrix. 1 ppm of analyte in a 1% calcium solution was used. The results are shown in FIG. 17. As can be seen, the matrix suppression varied depending on the particular analyte with some suppression being less than that observed with an ICP and some suppression being more than that observed with an ICP.

Example 5

Chlorine and bromine detection limits were determined using the CCP device. The results are shown in FIG. 18. ICP detection limits were not performed for comparison.

Example 6

Figure 19:
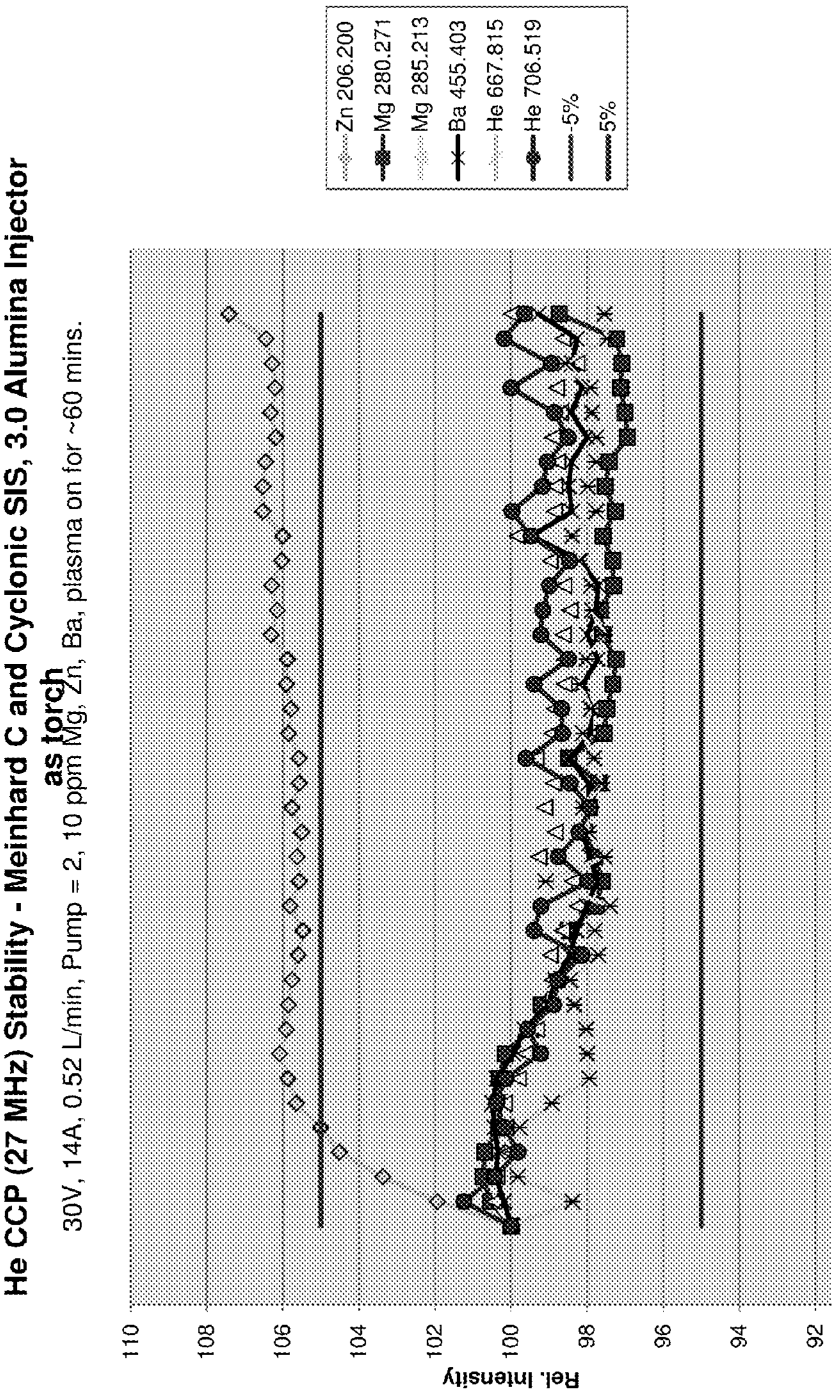
FIG. 19 is a graph showing the stability of a helium CCP after 60 minutes of warm up time, in accordance with certain examples.

To determine the long term stability of a CCP, 10 ppm of several analytes were injected into the CCP device and their signal intensities were monitored as a function of time. The plasma was run for 60 minutes prior to introduction of any analyte. Ideally, the relative intensity is between the 95-105% for stable performance (+/−5% of 100% relative intensity), as shown by the two bars in the graph of FIG. 19. For all tested analytes except zinc, the CCP provided stable performance. The zinc signal drifted above 105% and then stabilized at around 106% relative intensity, but it was believed the zinc signal would return to a level within the bars at longer time intervals.

Figure 20:
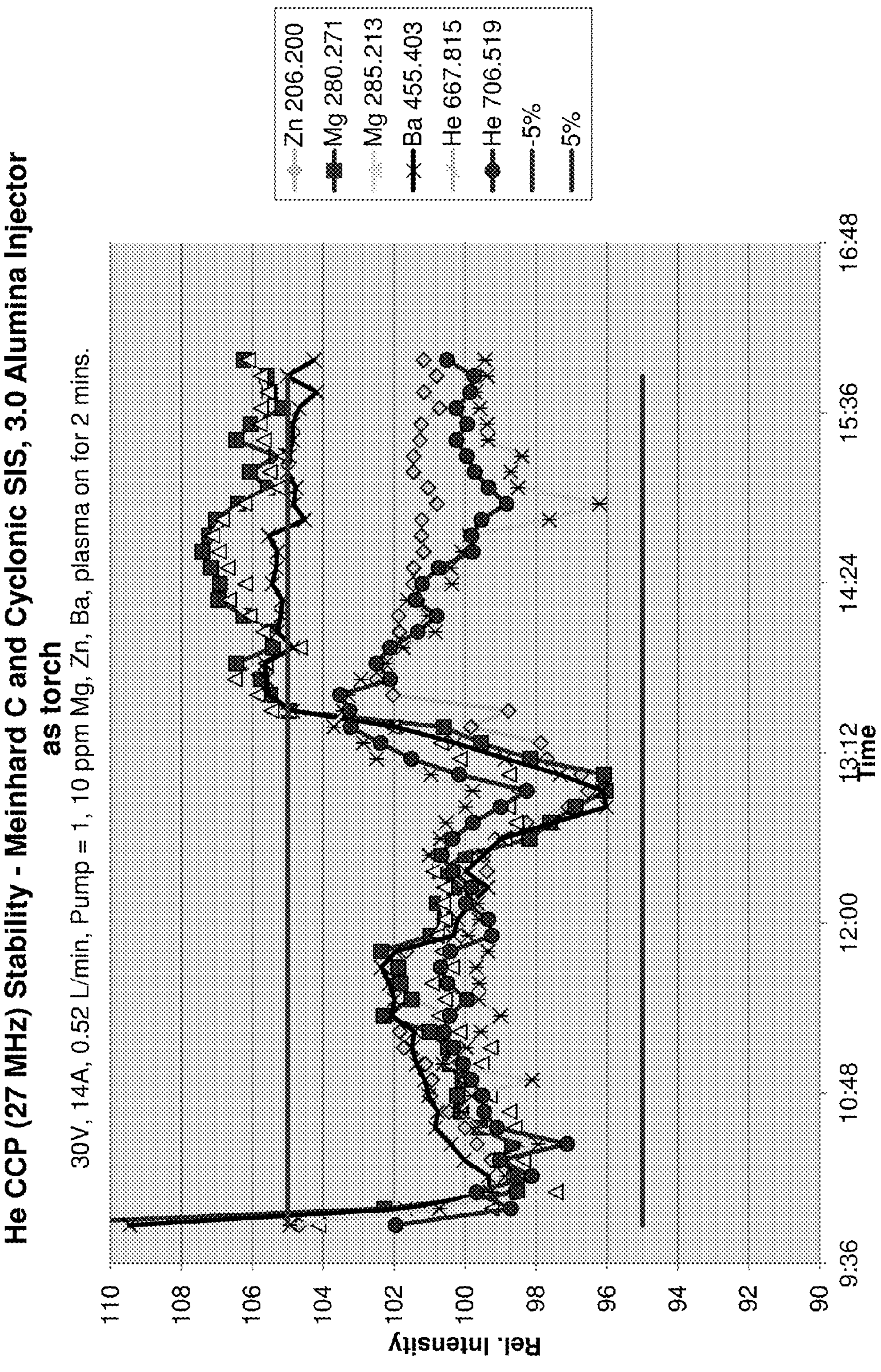
FIG. 20 is a graph showing the stability of a helium CCP after 5 minutes of warm up time, in accordance with certain examples.

Similar measurements were performed using a different pump rate (1 mL/minute), and the results are shown in FIG. 20. In addition, the CCP device was run for only 2 minutes (a "cold start") prior to injection of 10 ppm of the analyte. As shown in FIG. 20, the measurements were less linear than those observed in FIG. 19. In addition, several elements (Mg and Ba) provided relative intensities above the 105% value at longer times. When comparing the results of FIGS. 19 and 20, it may be desirable to permit the CCP to "warm up" for a period prior to sample introduction to increase the overall precision.

Example 7

Figure 21:
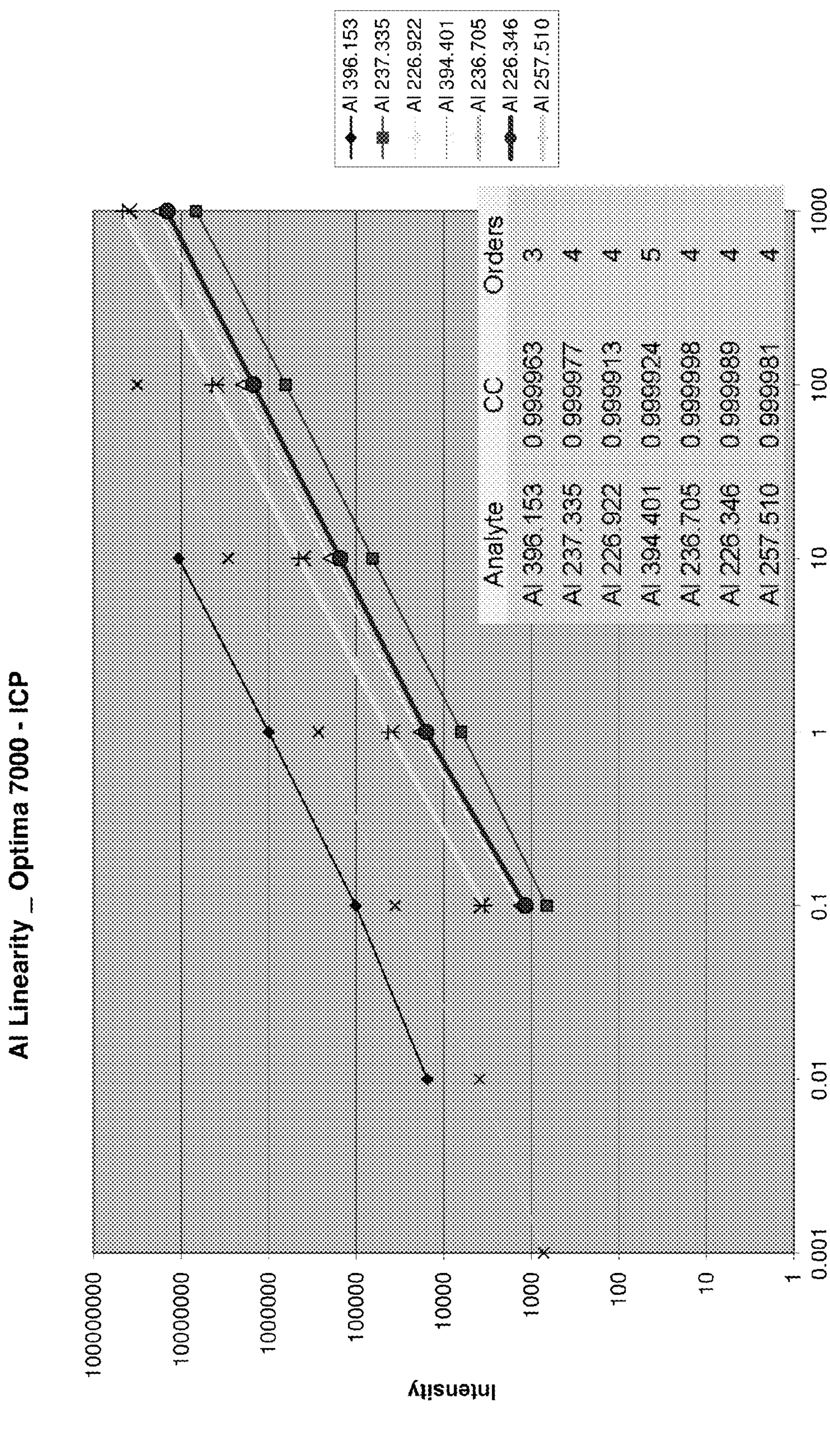
FIG. 21 is a graph showing the linear relationship of aluminum as a function of concentration when analyzed with an ICP device, in accordance with certain examples.
Figure 22:
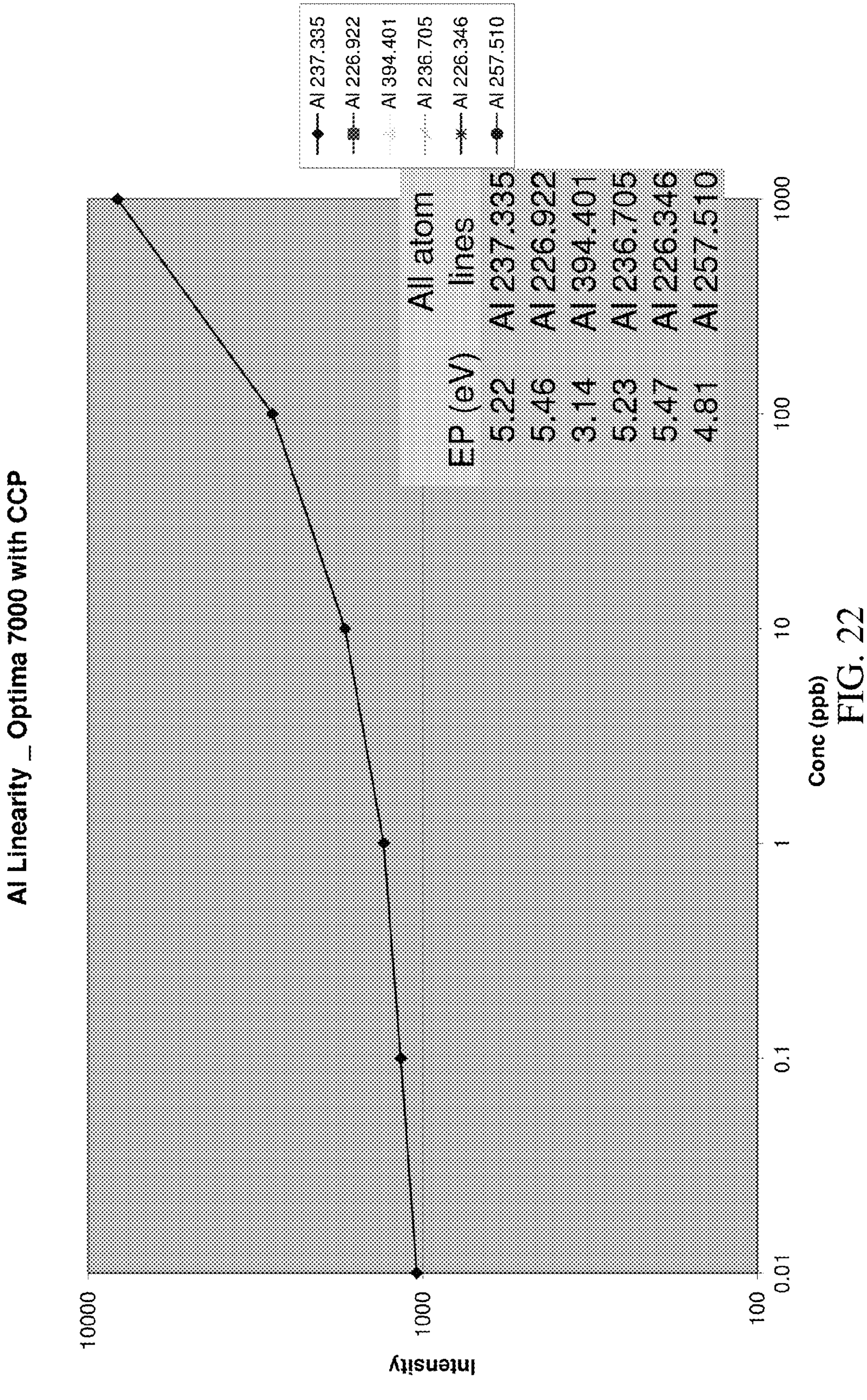
FIG. 22 is a graph showing the linear relationship of aluminum as a function of concentration when analyzed with an CCP device, in accordance with certain examples.
Figure 23:
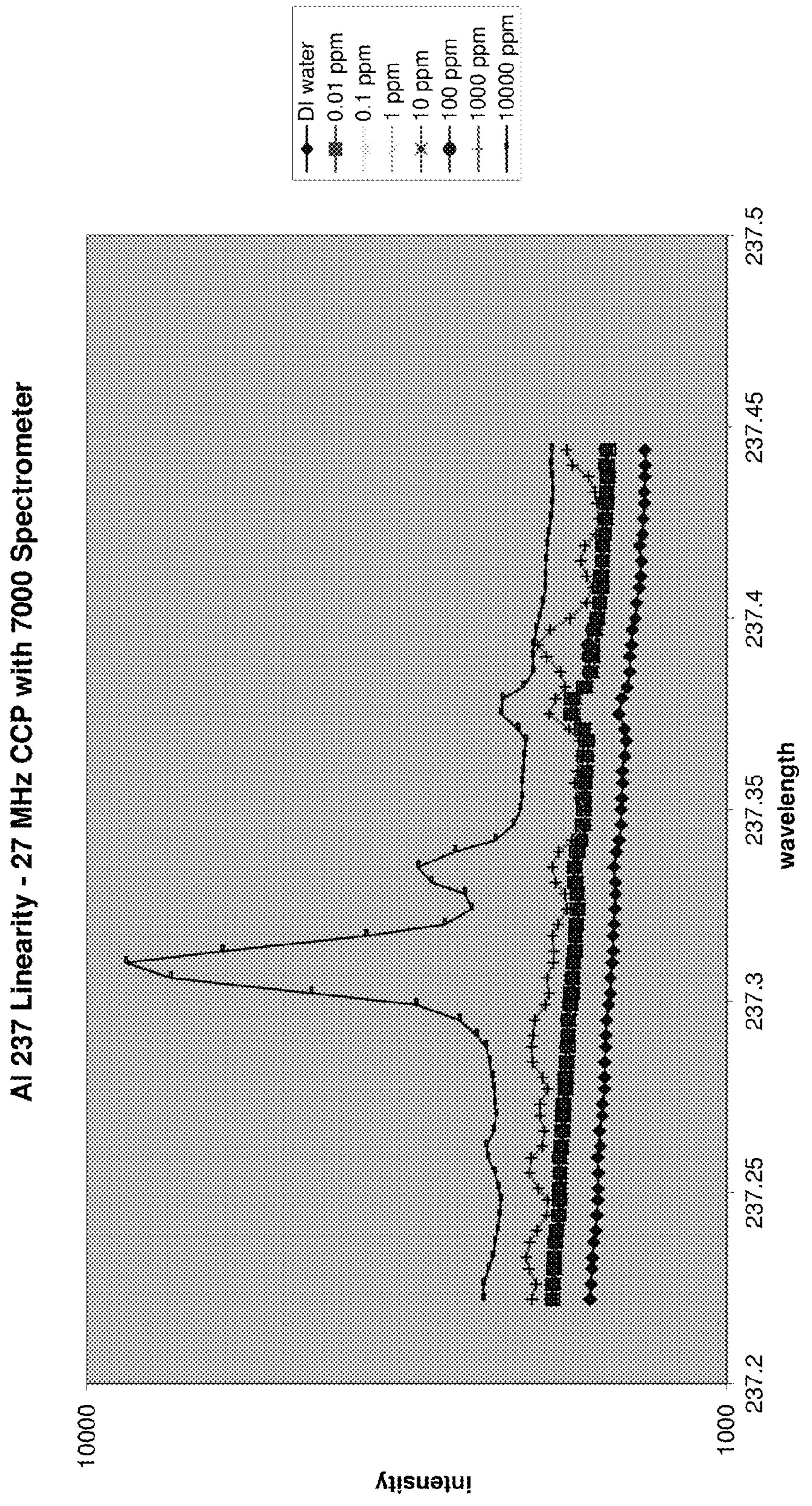
FIGS. 23-26 are scans showing intensity as a function of wavelength for various concentration of aluminum, in accordance with certain examples.
Figure 24:
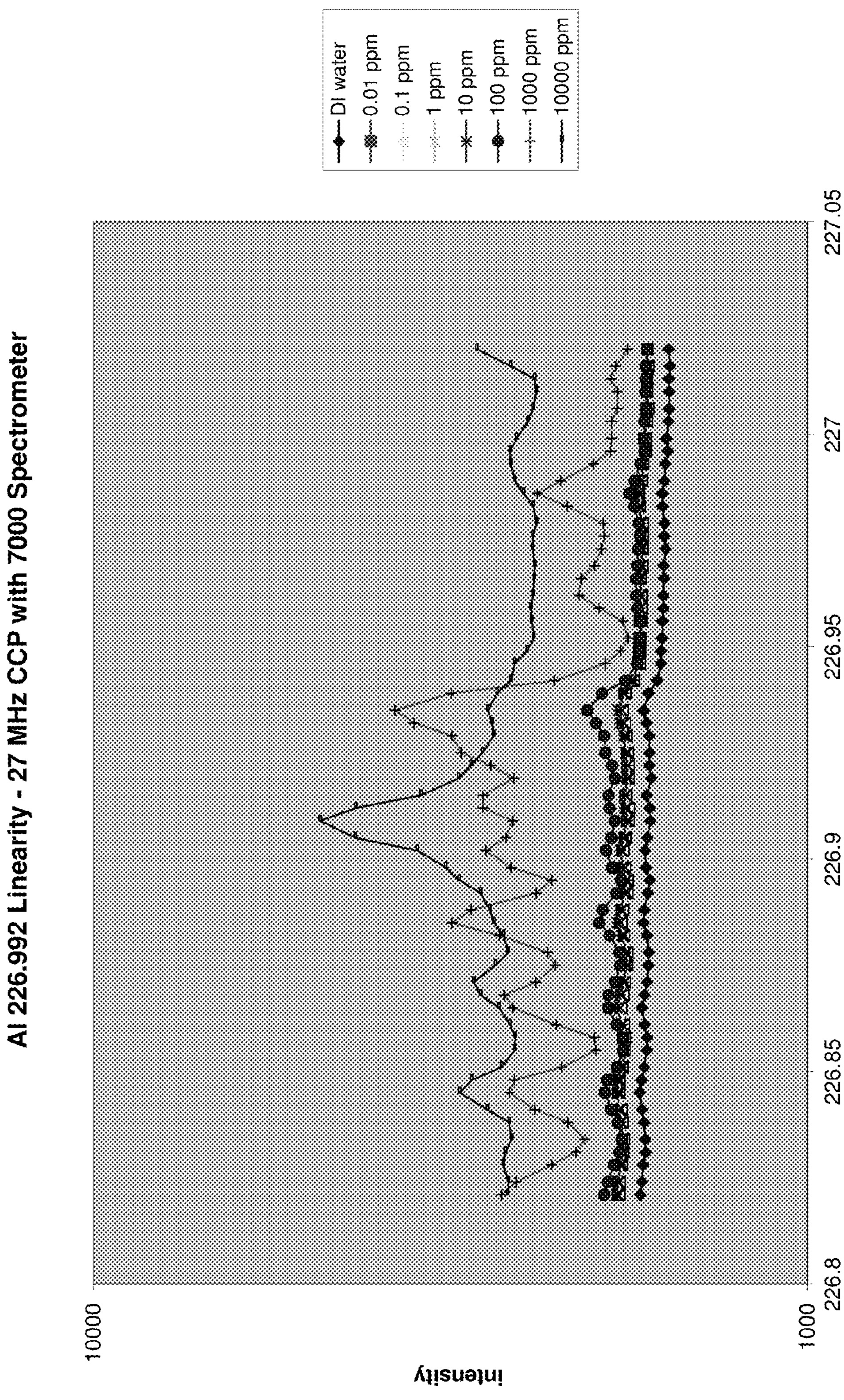
Figure 25:
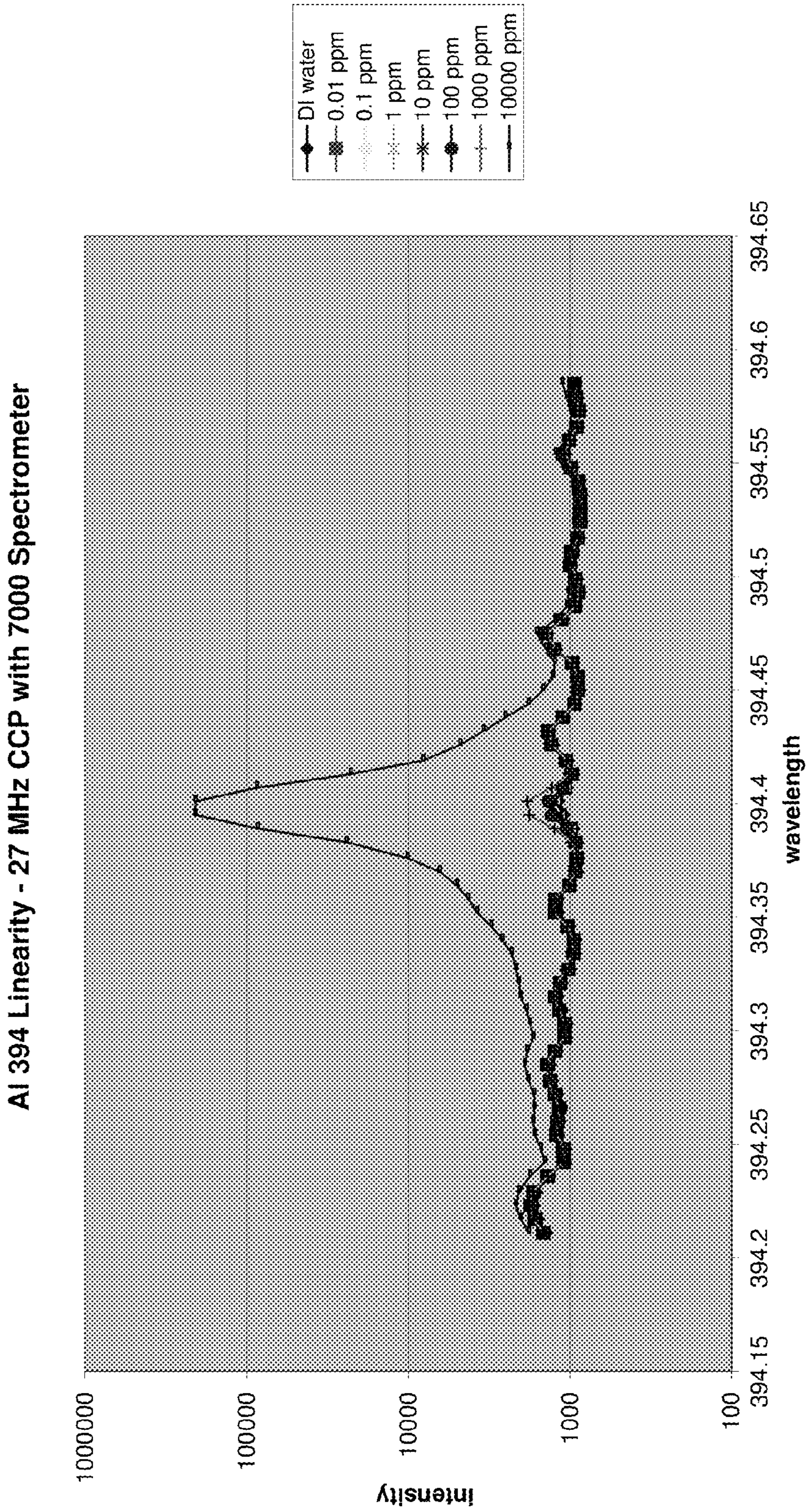
Figure 26:
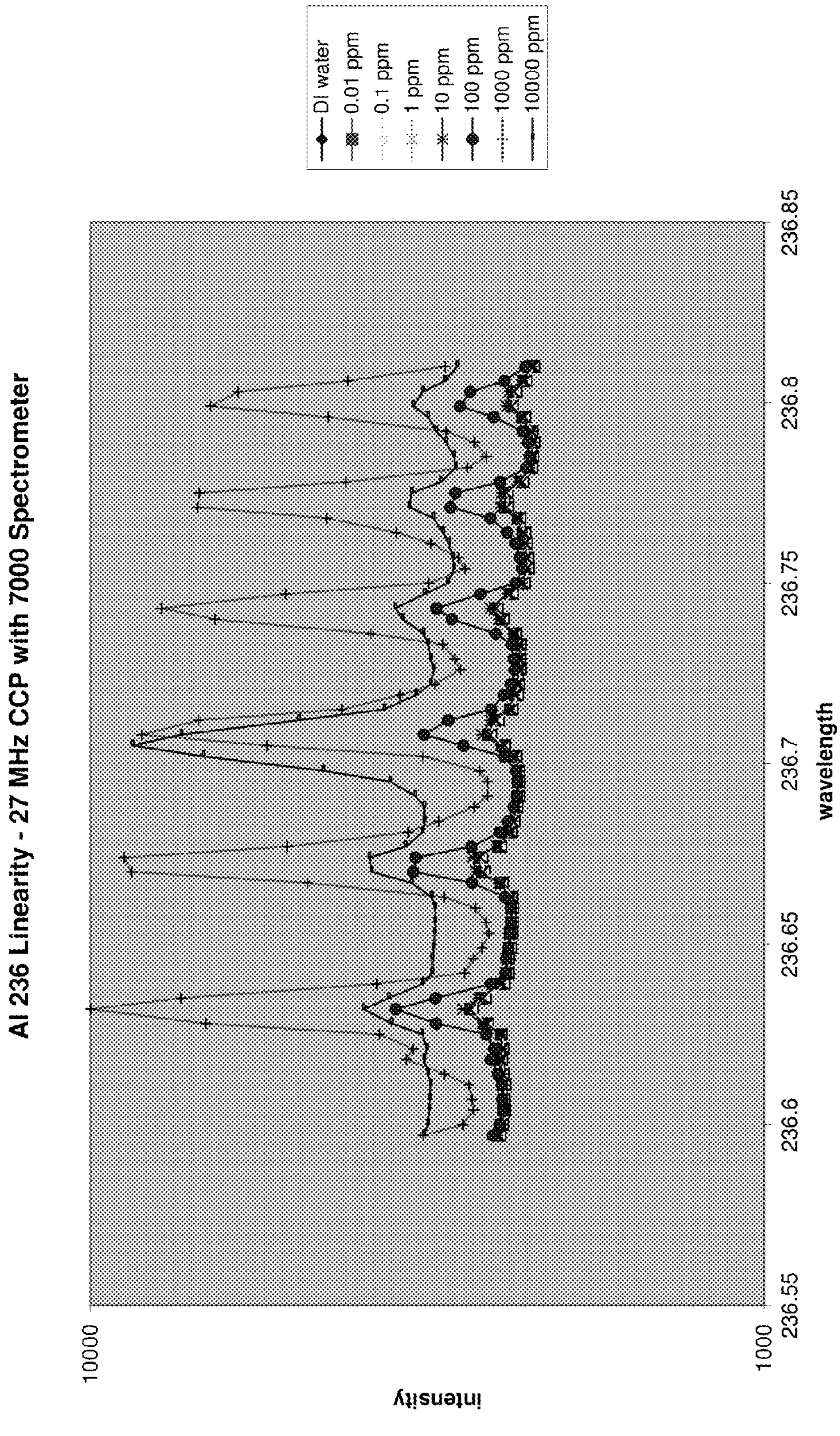

The effect of concentration on signal was tested in the ICP and CCP instruments for aluminum. The results are shown in FIG. 21 for the ICP measurements using an Optima 7000 instrument and FIG. 22 for the CCP measurements using the oscillator of Example 1. The ICP signal is very linear over a wide concentration range. The CCP signal is linear at low concentrations but the linearity decreases at higher concentrations. Aluminum can form oxides very readily, and the lower temperature of the CCP is consistent with higher oxide formation and decreased linearity of the signal. To increase linearity, the aluminum analyte can be placed in an oil or the sample could be desolvated prior to introduction into the CCP to reduce oxide formation.

Example 8

The wavelength was scanned for aluminum at different concentrations to determine the background signal. The results are shown in FIGS. 23-26. The background signal varied slightly with the different concentrations, and different wavelengths provided different signals at the same concentrations. The Al 394 scan (FIG. 25) exhibited more reproducibility than the other scans.

Example 9

Figure 27:
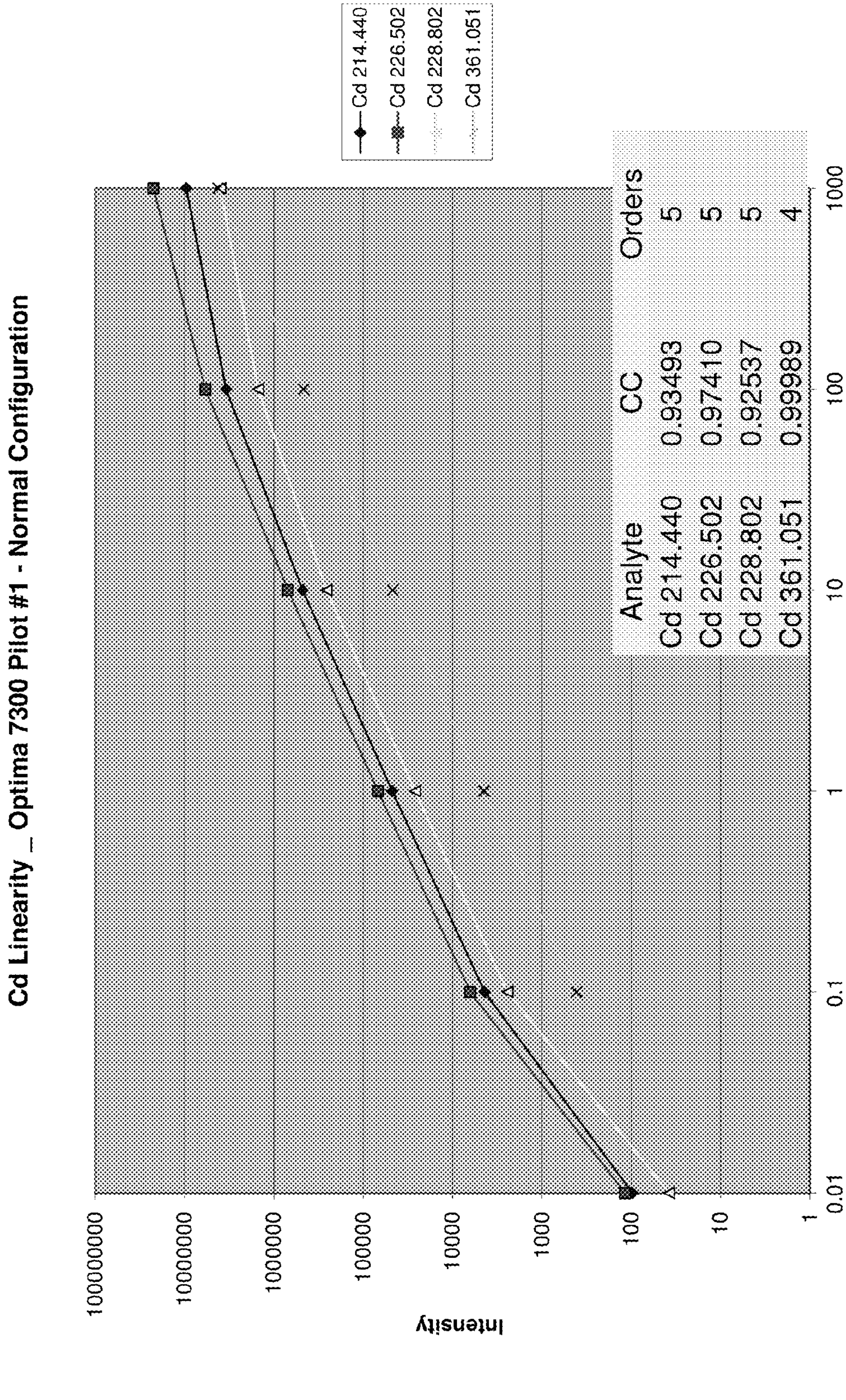
FIG. 27 is a graph showing the linear relationship of cadmium intensity as a function of concentration when analyzed with an ICP device, in accordance with certain examples.
Figure 28:
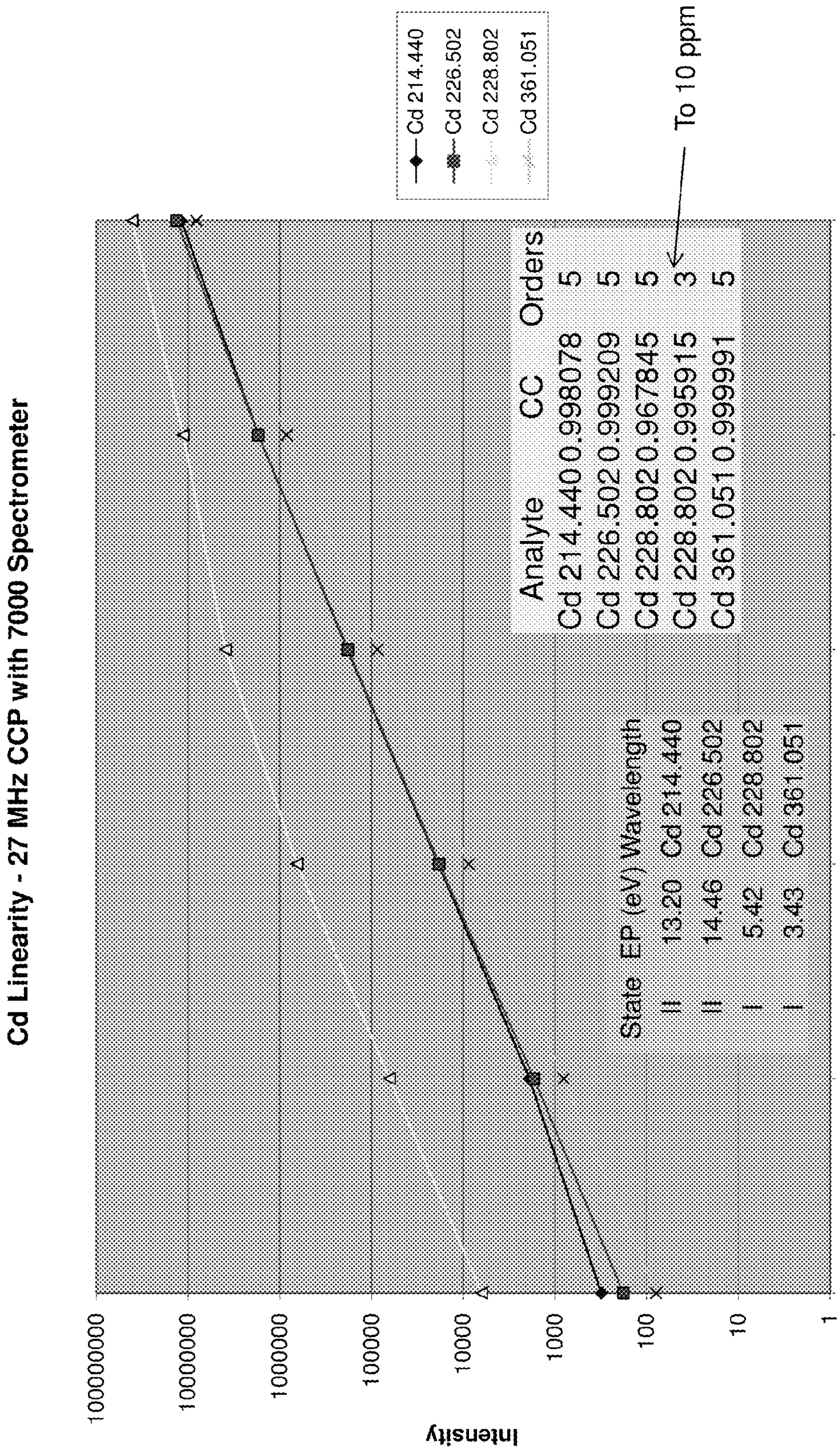
FIG. 28 is a graph showing the linear relationship of cadmium intensity as a function of concentration when analyzed with an CCP device, in accordance with certain examples.

Different cadmium concentrations were scanned using an ICP (FIG. 27) and the CCP device (FIG. 28). The CCP device provided a more linear concentration curve for cadmium than did the ICP device particularly for the lower wavelength scans.

Example 10

Figure 29:
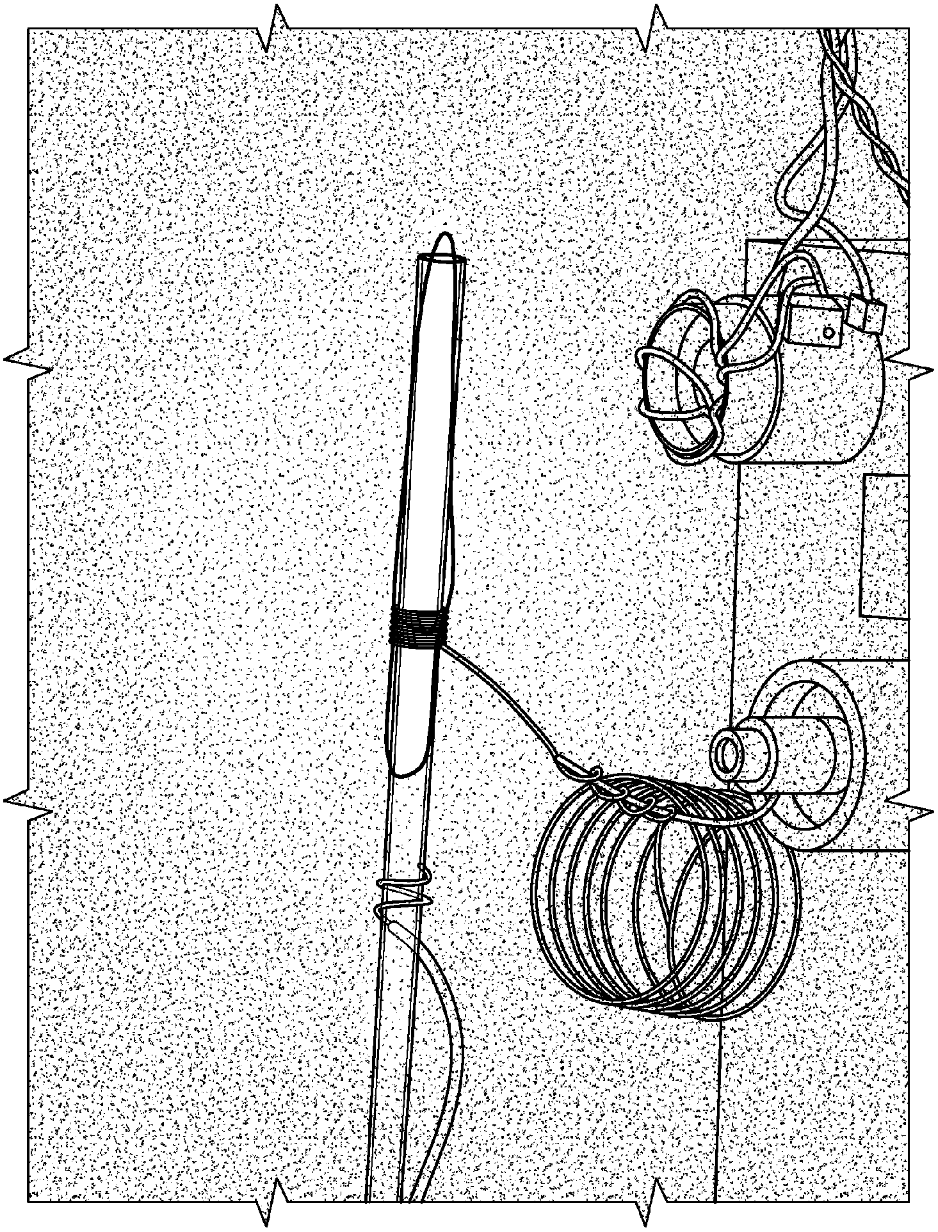
FIGS. 29-34 are line drawings produced from photographs of CCPs sustained using the oscillator circuit of FIG. 2, in accordance with certain examples.

A CCP device comprising a wire coil wrapped around a quartz tube was used to sustain a CCP within the quartz tube. A helium plasma gas was used along with the following parameters: voltage of 48 Volts, a current of 20 amps, and a frequency of 38.5 MHz was provided. The torch was kept at atmospheric pressure. The capacitively coupled plasma that was sustained is shown in FIG. 29.

Example 11

Figure 30:
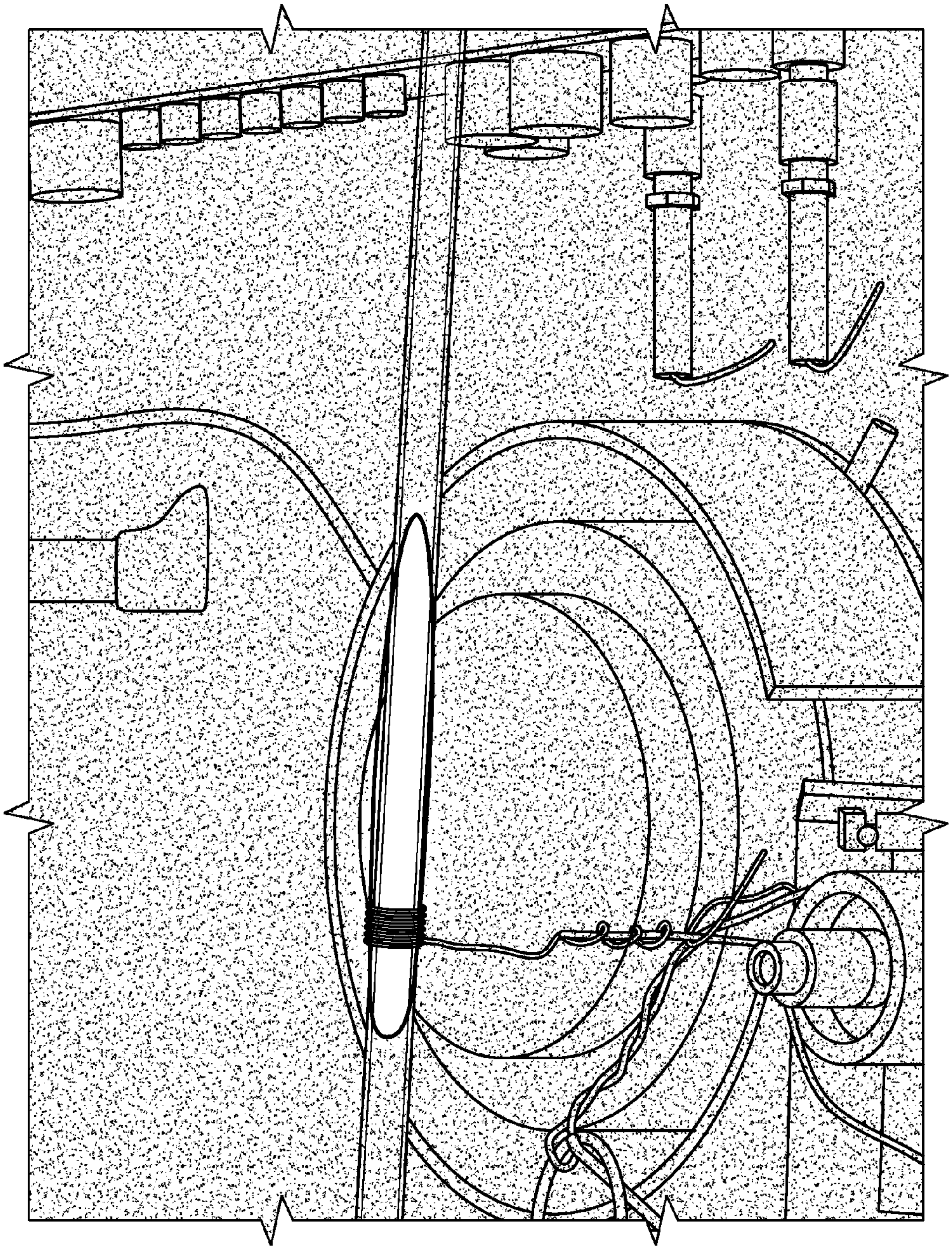

A CCP device comprising a wire coil wrapped around a quartz tube was used to sustain a CCP within the quartz tube. A helium plasma gas was used along with the following parameters: voltage of 35 Volts, a current of 20 amps, and a frequency of 38.5 MHz was provided. The torch was operated at a reduced pressure of 5 inches of mercury below atmospheric pressure. The capacitively coupled plasma that was sustained is shown in FIG. 30.

Example 12

Figure 31:
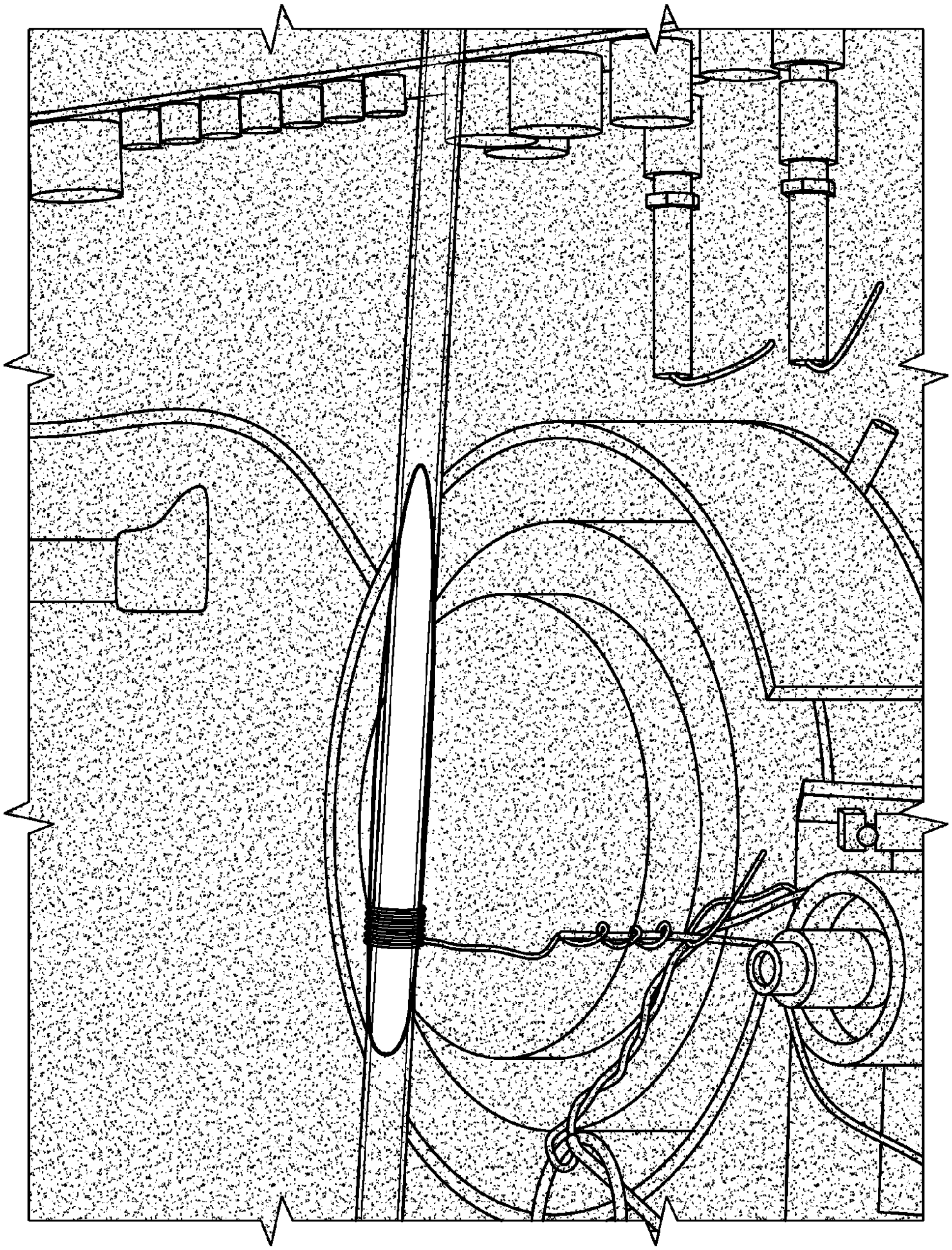

A CCP device comprising a wire coil wrapped around a quartz tube was used to sustain a CCP within the quartz tube. A helium plasma gas was used along with the following parameters: voltage of 34 Volts, 20 amps, and a frequency of 38.5 MHz was provided. The torch was operated at a reduced pressure of 10 inches of mercury below atmospheric pressure. The capacitively coupled plasma that was sustained is shown in FIG. 31.

Example 13

Figure 32:
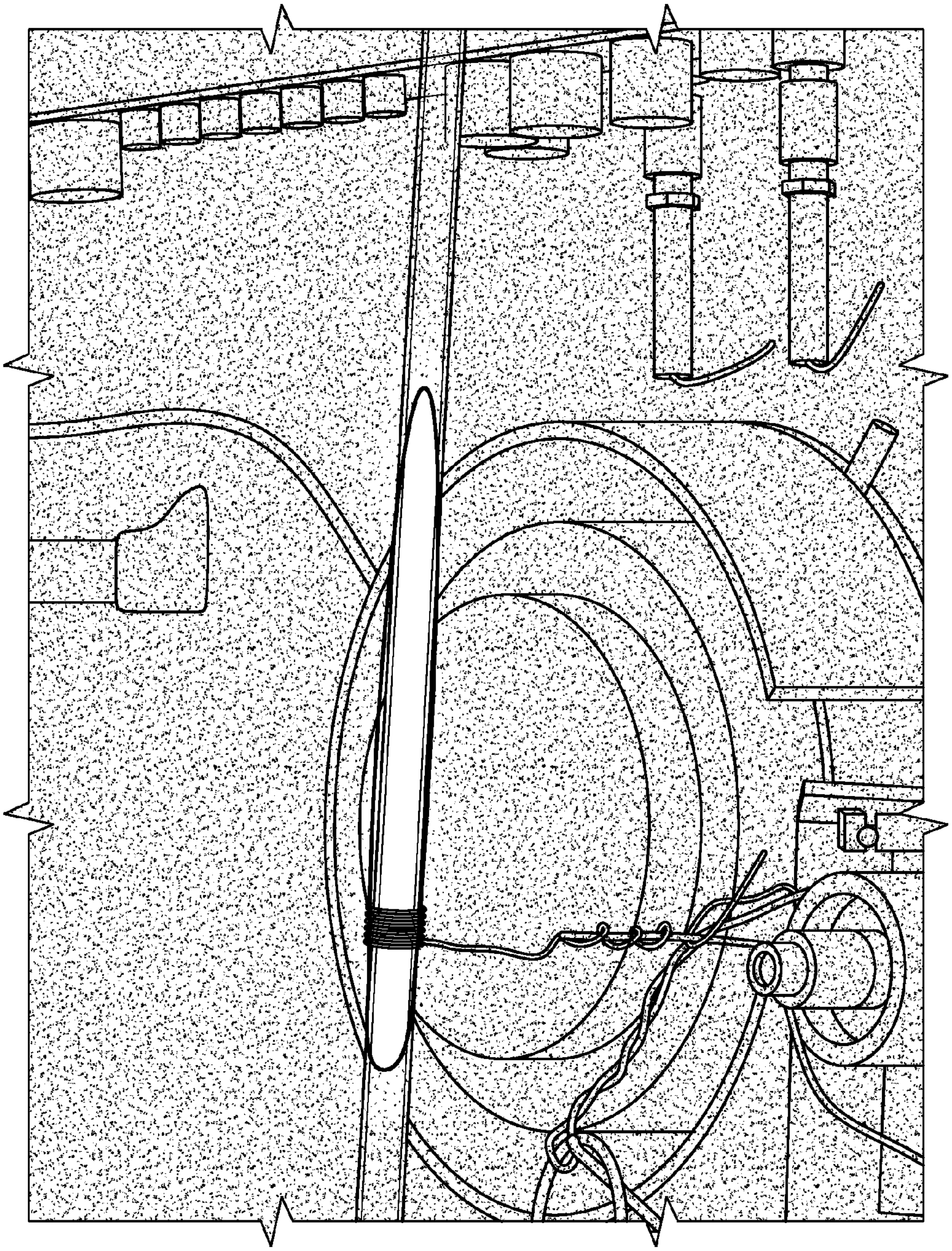

A CCP device comprising a wire coil wrapped around a quartz tube was used to sustain a CCP within the quartz tube. A helium plasma gas was used along with the following parameters: voltage of 33 Volts, 20 amps, and a frequency of 38.5 MHz was provided. The torch was operated at a reduced pressure of 15 inches of mercury below atmospheric pressure. The capacitively coupled plasma that was sustained is shown in FIG. 32.

Example 14

Figure 33:
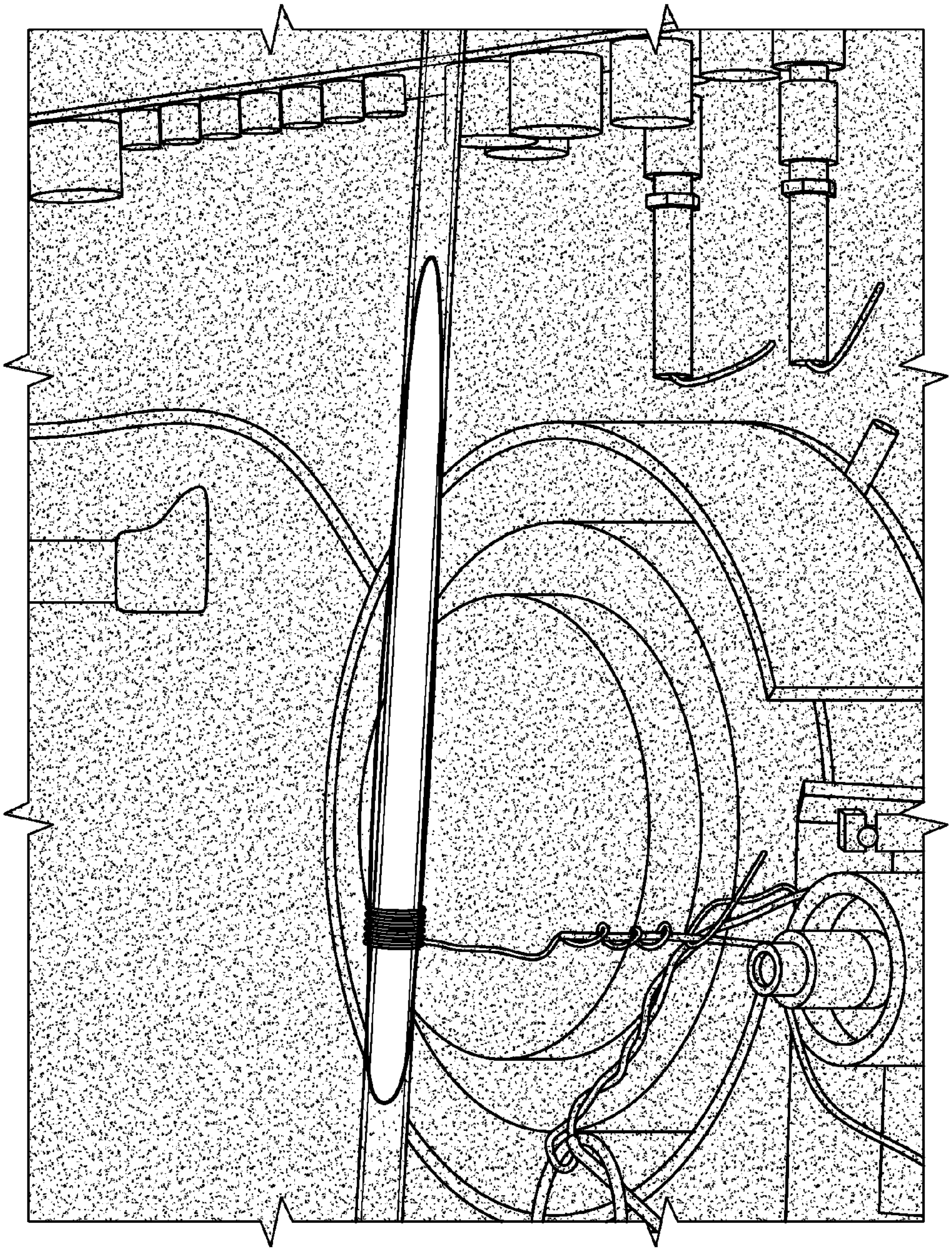

A CCP device comprising a wire coil wrapped around a quartz tube was used to sustain a CCP within the quartz tube. A helium plasma gas was used along with the following parameters: voltage of 32 Volts, 20 amps, and a frequency of 38.5 MHz was provided. The torch was operated at a reduced pressure of 20 inches of mercury below atmospheric pressure. The capacitively coupled plasma that was sustained is shown in FIG. 33.

Example 15

Figure 34:
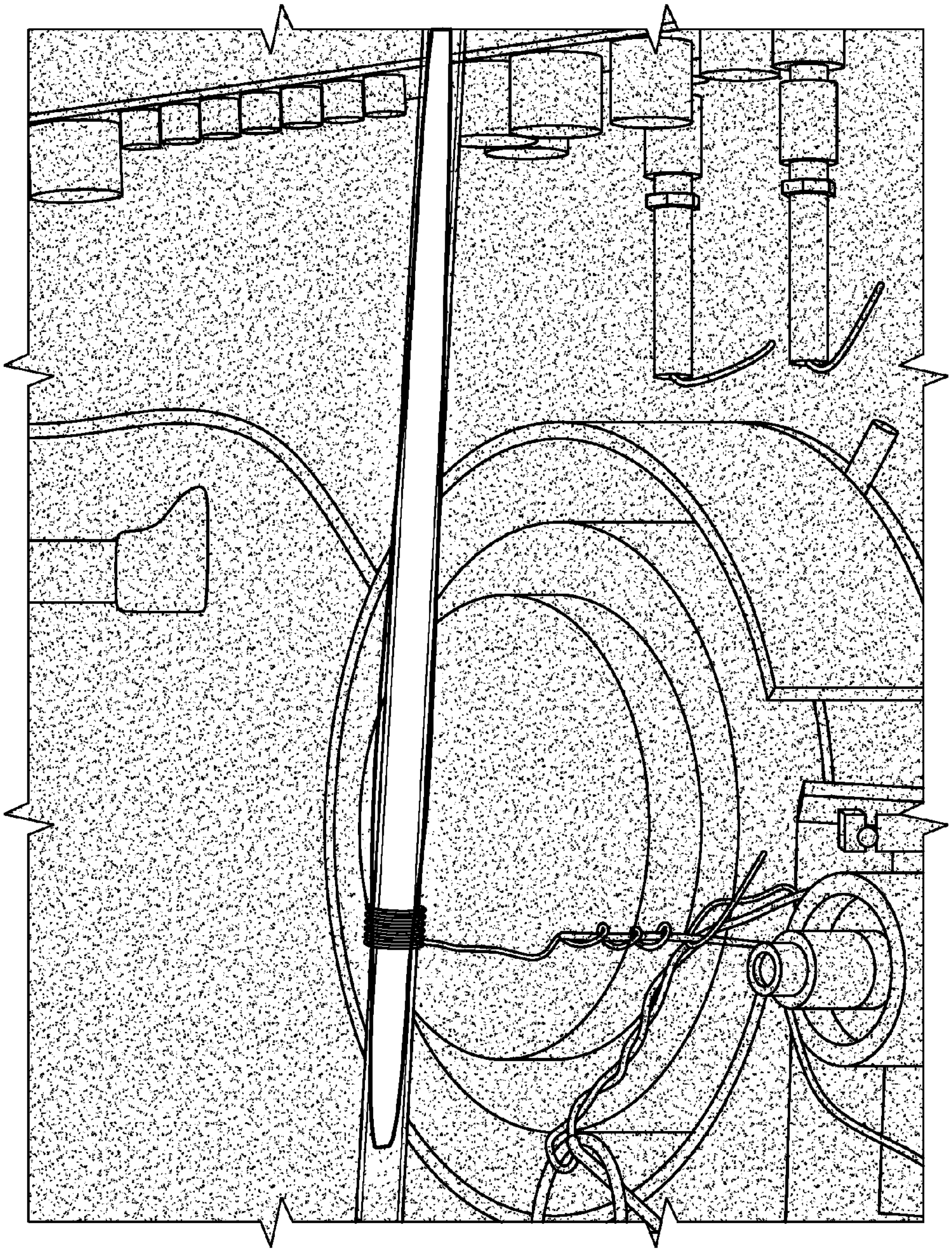

A CCP device comprising a wire coil wrapped around a quartz tube was used to sustain a CCP within the quartz tube. A helium plasma gas was used along with the following parameters: voltage of 32 Volts, 20 amps, and a frequency of 38.5 MHz was provided. The torch was operated at a reduced pressure of 25 inches of mercury below atmospheric pressure. The capacitively coupled plasma that was sustained is shown in FIG. 34.

When comparing the different pressures used in Examples 10-15, as the pressure decreased the overall length of the CCP increased along the longitudinal direction of the torch.

Example 16

A CCP device configured as a plate electrode can be used with a 0.5 L/minute helium gas flow and an alumina tube as a torch to sustain a capacitively coupled plasma in the alumina tube. An oscillator having the circuit of FIG. 2 can be used. The alumina tube can be placed in an Optima 7000 series instrument in place of the injector. A standard sample introduction system can be used.

An oscillator having the circuit of FIG. 2 can be placed inside of the Optima 7000 OES instrument. RF energy can be coupled to the alumina tube through the plate electrode. Ambient air can be blown through the honeycomb at the bottom of the torch compartment using a muffin fan to cool the oscillator.

Example 17

A CCP device configured with a capacitive device and can be used with a 0.5 L/minute helium gas flow and an alumina tube as a torch to sustain a capacitively coupled plasma in the alumina tube. The alumina tube can be placed in an Optima 7000 series instrument in place of the injector. A standard sample introduction system can be used.

An oscillator having the circuit of FIG. 2 can be electrically coupled to a 12 Volt DC battery to provide power. RF energy can be coupled to the alumina tube through the capacitive device. Ambient air can be blown through the honeycomb at the bottom of the torch compartment using a muffin fan to cool the oscillator.

Example 18

A CCP device configured with a capacitive device and can be used with a 0.5 L/minute helium gas flow and an alumina tube as a torch to sustain a capacitively coupled plasma in the alumina tube. The alumina tube can be placed in an Optima 7000 series instrument in place of the injector. A standard sample introduction system can be used.

An oscillator having the circuit of FIG. 2 can be electrically coupled to a fuel cell such as a methanol fuel cell, a proton exchange membrane fuel cell, a solid oxide fuel cell or other known fuel cells, to provide power. RF energy can be coupled to the alumina tube through the capacitive device. Ambient air can be blown through the honeycomb at the bottom of the torch compartment using a muffin fan to cool the oscillator.

Example 19

A CCP device configured with a capacitive device and can be used with a 0.5 L/minute helium gas flow and an alumina tube as a torch to sustain a capacitively coupled plasma in the alumina tube. The alumina tube can be placed in an Optima 7000 series instrument in place of the injector. A standard sample introduction system can be used.

An oscillator having the circuit of FIG. 2 can be used and electrically coupled to a photovoltaic cell array to provide power. RF energy can be coupled to the alumina tube through the capacitive device. Ambient air can be blown through the honeycomb at the bottom of the torch compartment using a muffin fan to cool the oscillator.

Example 20

Figure 36:
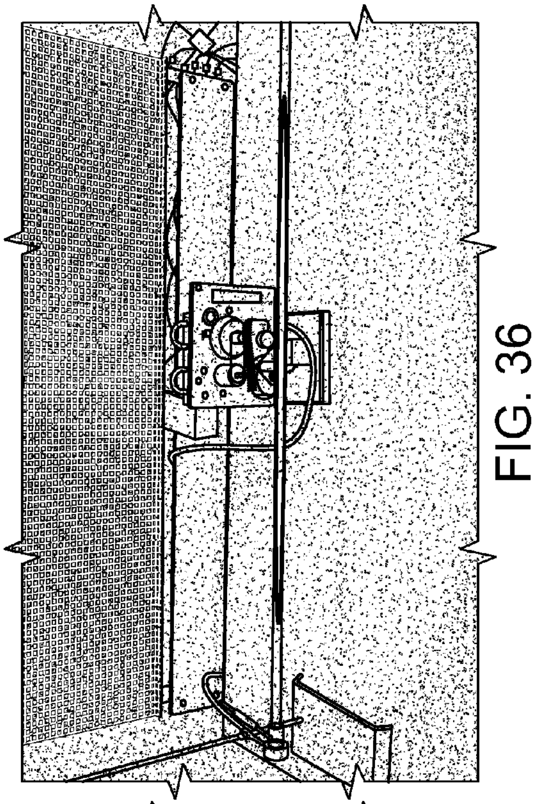
FIG. 35-37 are line drawings produced from photographs of CCPs sustained in a torch of about 1 meter and using argon, nitrogen and ambient air, respectively, in accordance with certain examples.
Figure 35:
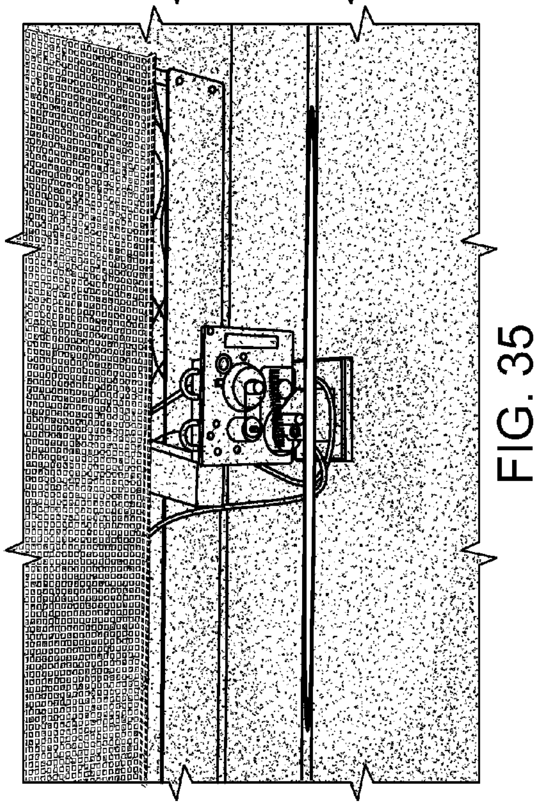
Figure 37:
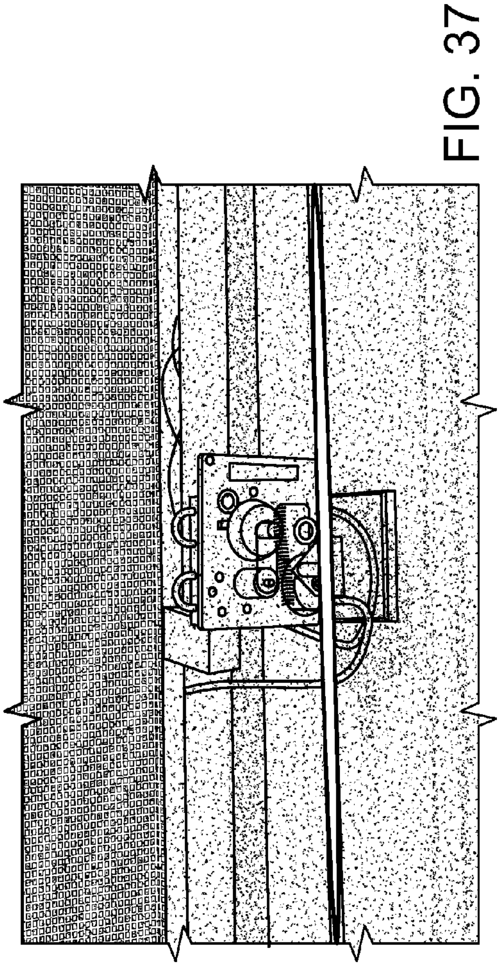

A CCP can be sustained using many different types of plasma gases and an oscillator including the circuit of FIG. 2 (or similarly arranged circuits). CCPs sustained using different gases are shown in FIGS. 35-37. FIG. 35 is a line drawing produced from a photograph of a CCP sustained in a 1 meter hollow torch using argon. FIG. 36 is a line drawing produced from a drawing produced from a photograph of a CCP sustained in a 1 meter hollow torch using nitrogen. FIG. 37 is a line drawing produced from a photograph of a CCP sustained in a 1 meter hollow torch using ambient room air.

Example 21

Figure 38:
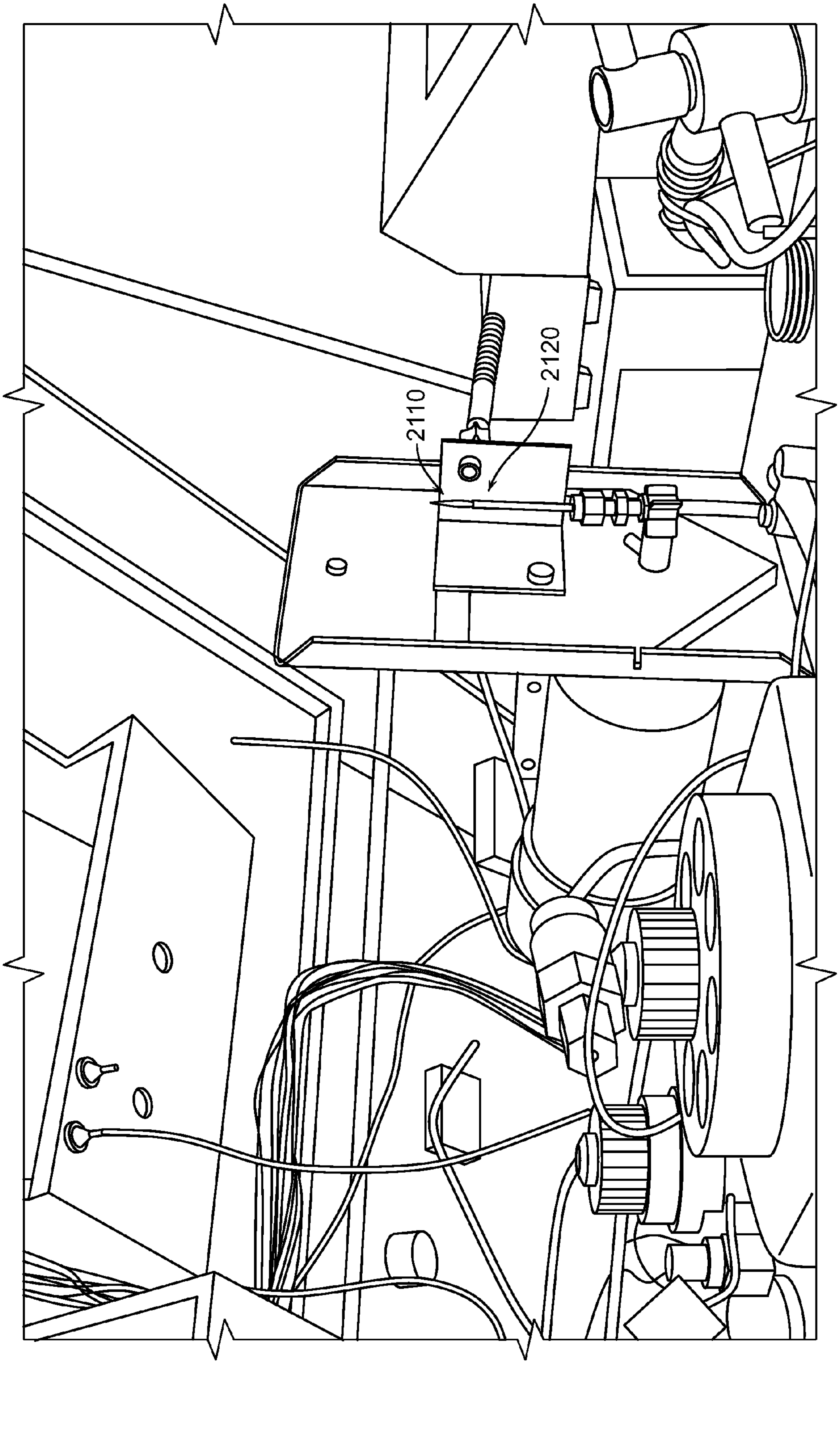
FIG. 38 is a line drawing produced from a photograph of a CCP sustained in a 0.53 mm quartz capillary GC column using helium, in accordance with certain examples.

A CCP can be sustained in a torch about the size of a capillary GC column. FIG. 38 shows a line drawing produced from a photograph of a CCP 2110 sustained with helium gas in a 0.53 mm capillary GC column 2120. The ability to sustain CCPs in capillary sized devices permits significant reduction in the amount of gas needed to sustain the CCP.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A device comprising:

a torch; and a capacitive device external to and around at least a portion of the torch and contacting an outer surface of the torch, the capacitive device configured to provide radio frequency energy to the torch to sustain a capacitively coupled plasma in the torch, wherein the capacitive device comprises a wire coil external to and coiled around the torch, in which the wire coil is configured to couple to an oscillator at a first end of the wire coil and configured to contact an outer surface of the torch at a second terminal end of the wire coil to provide capacitive coupling to the torch.

2. The device of claim 1, in which the capacitive device is configured to sustain the capacitively coupled plasma in the absence of any substantial inductive coupling.

3. The device of claim 1, in which the wire coil comprises a plurality of wires each of which contacts adjacent wires and the outer surface of the torch.

4. The device of claim 3, in which the torch comprises a substantially cylindrical hollow alumina body.

5. The device of claim 4, in which the device further comprises the oscillator, and wherein the capacitive device is electrically coupled to the oscillator at the first end of the wire coil.

6. The device of claim 1, in which the capacitive device is a substantially cylindrical device that surrounds at least a portion of the torch.

7. The device of claim 6, in which the device further comprises the oscillator, and wherein the capacitive device is electrically coupled to the oscillator at the first end of the wire coil.

8. The device of claim 1, in which the capacitive device is electrically coupled to an oscillator.

9. The device of claim 1, in which the capacitive device is operative to sustain the capacitively coupled plasma in the torch when it is present by itself and when it is electrically coupled to an oscillator at the first end of the wire coil and contacts the torch at the second terminal end of the wire coil.

10. The device of claim 1, further comprising an additional capacitive device configured to provide radio frequency energy to the torch.

11. The device of claim 10, in which the capacitive device and the additional capacitive device are each electrically coupled to the same oscillator.

12. The device of claim 10, in which the capacitive device and the additional capacitive device are each electrically coupled to a different oscillator.

13. The device of claim 11, in which the additional capacitive device comprises a plate electrode.

14. The device of claim 1, in which the capacitive device is constructed and arranged to operate using 110-120 Volts alternating current.

15. The device of claim 1, in which the capacitive device is constructed and arranged to operate using a portable power source.

16. A non-inductively coupled plasma device comprising:

a torch; and a single capacitive device configured to provide radio frequency energy to the torch to sustain a capacitively coupled plasma in the torch without the use of inductive coupling, in which an inner surface of the single capacitive device contacts an outer surface of the torch, wherein the single capacitive device is external to and receives the torch through an aperture of the capacitive device, in which the single capacitive device is configured to couple to an oscillator at a first site of the capacitive device and is configured to contact the outer surfaces of the torch at a second site of the single capacitive device different from the first site.

17. The device of claim 16, in which the single capacitive device comprises a coil of wire comprising a plurality of wires each of which contacts adjacent wires of the coil of wire.

18. The device of claim 16, in which the torch comprises alumina.

19. The device of claim 16, in which the single capacitive device is configured as a single plate electrode.

20. The device of claim 16, in which the single capacitive device is a substantially cylindrical device that surrounds at least a portion of the torch and contacts the outer surfaces of the torch at inner surfaces of the cylindrical device that surround the portion of the torch.

* * * * *